(12) United States Patent
Pettersson et al.

(10) Patent No.: US 12,513,337 B2
(45) Date of Patent: Dec. 30, 2025

(54) MESSAGE REFERENCING

(71) Applicant: Telefonaktiebolaget LM Ericsson (publ), Stockholm (SE)

(72) Inventors: Martin Pettersson, Vallentuna (SE); Rickard Sjöberg, Stockholm (SE); Mitra Damghanian, Upplands-Bro (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 45 days.

(21) Appl. No.: 18/286,552

(22) PCT Filed: Apr. 11, 2022

(86) PCT No.: PCT/SE2022/050359
§ 371 (c)(1),
(2) Date: Oct. 11, 2023

(87) PCT Pub. No.: WO2022/220724
PCT Pub. Date: Oct. 20, 2022

(65) Prior Publication Data
US 2024/0205460 A1 Jun. 20, 2024

Related U.S. Application Data

(60) Provisional application No. 63/173,664, filed on Apr. 12, 2021.

(51) Int. Cl.
*H04N 19/70* (2014.01)
*H04N 19/169* (2014.01)

(52) U.S. Cl.
CPC ........... *H04N 19/70* (2014.11); *H04N 19/188* (2014.11)

(58) Field of Classification Search
CPC .... H04N 19/70; H04N 19/188; H04N 19/184; H04N 19/46
See application file for complete search history.

(56) References Cited

U.S. PATENT DOCUMENTS

| 10,554,981 B2 * | 2/2020 | Ramasubramonian ..................... H04N 19/172 |
| 2014/0086317 A1 * | 3/2014 | Wang ..................... H04N 19/61 375/240.12 |

(Continued)

FOREIGN PATENT DOCUMENTS

| JP | 2020-511861 A | 4/2020 |
| WO | 2020/239743 A1 | 12/2020 |

OTHER PUBLICATIONS

Boyce et al. ("Additional SEI messages for VSEI (Draft 2)", Joint Video Experts Team (JVET) of ITU-T SG 16 WP 3 and ISO/IEC JTC 1/SC 29, 21st Meeting, by teleconference, Jan. 6-15, 2021, Document: JVET-U2006-v1) (Year: 2021).*

(Continued)

*Primary Examiner* — Maria E Vazquez Colon
(74) *Attorney, Agent, or Firm* — Rothwell, Figg, Ernst & Manbeck, P.C.

(57) ABSTRACT

There is provided a referencing mechanism for messages (e.g., SEI messages) in order to reduce the bit cost when different versions of messages (e.g., SEI messages) are used in an arbitrary manner in the bitstream, e.g. in an alternating way in the bitstream. In embodiments, two SEI messages are used to express a functionality. In the first SEI message, syntax elements specifying the functionality is provided. The first SEI message may also have an identifier value, which uniquely identifies the instance of that particular SEI message. The second SEI message, typically much smaller and sent more frequently than the first SEI message, is used to reference the first SEI message in order to apply the (Continued)

functionality of the first SEI message to a part of the bitstream determined by the persistence scope of the second SEI message, e.g. for the picture or subpicture it was sent with.

19 Claims, 7 Drawing Sheets

(56) References Cited

U.S. PATENT DOCUMENTS

| | | | |
|---|---|---|---|
| 2014/0092993 A1* | 4/2014 | Wang | H04N 19/61 375/240.26 |
| 2014/0098894 A1* | 4/2014 | Wang | H04N 19/30 375/240.26 |
| 2015/0271498 A1* | 9/2015 | Wang | H04N 19/60 375/240.02 |
| 2015/0271513 A1* | 9/2015 | Hendry | H04N 19/187 375/240.26 |
| 2018/0278964 A1* | 9/2018 | Wang | H04N 21/6332 |

OTHER PUBLICATIONS

Sjöberg, R. et al., "Mandatory film grain", Document: JVET-Q0424-v 1, Joint Video Experts Team (JVET) of ITU-T SG 16 WP 3 and ISO/IEC JTC 1/SC 29/WG 11, 17th Meeting: Brussels, BE, Jan. 7-17, 2020 (6 pages).

François, E. et al., "AHG9: Out-of-loop luma mapping with chroma scaling using APS or SEI message parameters signalling", Document: JVET-U0078, Joint Video Experts Team (JVET) of ITU-T SG 16 WP 3 and ISO/IEC JTC 1/SC 29, 21st Meeting, by teleconference, Jan. 6-15, 2021 (6 pages).

International Search Report and Written Opinion dated May 19, 2022 issued in International Patent Application No. PCT/SE2022/050359 (17 pages).

Boyce, J. et al., "Additional SEI messages for VSEI (Draft 2)", Document: JVET-U2006-v1, Joint Video Experts Team (JVET) of ITU-T SG 16 WP 3 and ISO/IEC JTC 1/SC 29, 21st Meeting, by teleconference, Jan. 6-15, 2021 (20 pages).

Boyce, J. et al., "Video usability information and supplemental enhancement information for coded video bitstreams (Draft 2)", JVET Meeting; Geneva, (The Joint Video Exploration Team of ISO/IEC JTC1/SC29/WG11 and ITU-T SG.16 ), Document No. JVET-P2007-v3, Joint Video Experts Team (JVET) of ITU-T SG 16 WP 3 and ISO/IEC JTC 1/SC 29/WG 11, 16th Meeting: Geneva, CH, Oct. 1-11, 2019, XP030224335 (76 pages).

Wang, Y. et al., "The High-Level Syntax of the Versatile Video Coding (VVC) Standard", IEEE Transactions on Circuits and Systems for Video Technology, IEEE, USA, vol. 31, No. 10, Oct. 2021, XP011880991 (22 pages).

Wang, Y., "The high-level syntax (HLS) designs in VVC", Sep. 2020, XP055921216 (55 pages).

Sjöberg, R. et al., "Mandatory film grain", Document: JVET-Q0424-v2, Joint Video Experts Team (JVET) of ITU-T SG 16 WP 3 and ISO/IEC JTC 1/SC 29/WG 11, 17th Meeting: Brussels, BE, Jan. 7-17, 2020 (8 pages).

Wikipedia Editors, "Data deduplication", Wikipedia, The Wayback Machine—https://web.archive.org/web/20210313110618://en.wikipedia.org/wiki/Data_deduplication, Mar. 13, 2021 (8 pages).

Singh, J., "Understanding Data Deduplication", www.druva.com, https://web.archive.org/web/20210301104756/https://www.druva.com/blog/understading-data-deduplication, Mar. 1, 2021 (10 pages).

* cited by examiner

MESSAGE REFERENCING

CROSS REFERENCE TO RELATED APPLICATIONS

This application is a 35 U.S.C. § 371 National Stage of International Patent Application No. PCT/SE2022/050359, filed 2022 Apr. 11, which claims priority to U.S. Provisional Patent Application No. 63/173,664, filed 2021 Apr. 12, which is incorporated by this reference.

TECHNICAL FIELD

This disclosure relates to coding and decoding of video sequences and/or still images, and more particularly, to message referencing.

BACKGROUND

VVC and HEVC

Versatile Video Coding (VVC) and High Efficiency Video Coding (HEVC) are block-based video codecs standardized and developed jointly by International Telecommunication Union-Telecommunication (ITU-T) and Motion Picture Experts Group (MPEG). The codecs utilize both temporal and spatial prediction. The first version of HEVC was finalized in April 2013 and the first version of VVC was finalized in July 2020. The current versions of the two codec specifications at the time of writing are HEVC version 7 and VVC version 1.

Spatial prediction is achieved using intra (I) prediction from within the current picture. Temporal prediction is achieved using uni-directional (P) or bi-directional inter (B) prediction on a block level from previously decoded reference pictures. In the encoder, the difference between the original pixel data and the predicted pixel data, referred to as the residual, is transformed into the frequency domain, quantized, and then entropy coded before being transmitted together with necessary prediction parameters such as prediction mode and motion vectors, which are also entropy coded. The decoder performs entropy decoding, inverse quantization, and inverse transformation to obtain the residual and then adds the residual to an intra or inter prediction to reconstruct a picture.

Components

A video sequence has a series of images where each image consists of one or more components. Each component can be described as a two-dimensional rectangular array of sample values. It is common that an image in a video sequence has three components; one luma component Y where the sample values are luma values and two chroma components Cb and Cr, where the sample values are chroma values. It is also common that the dimensions of the chroma components are smaller than the luma components by a factor of two in each dimension. For example, the size of the luma component of an HD image would be 1920×1080 and the chroma components would each have the dimension of 960×540. Components are sometimes referred to as color components.

NAL Units

Both VVC and HEVC define a Network Abstraction Layer (NAL). All the data, i.e. both Video Coding Layer (VCL) or non-VCL data in HEVC and VVC, is encapsulated in NAL units. A VCL NAL unit contains data that represents picture sample values. A non-VCL NAL unit contains additional associated data such as parameter sets and supplemental enhancement information (SEI) messages. The NAL unit in VVC and HEVC begins with a header called the NAL unit header. The syntax for the NAL unit header for HEVC starts with a forbidden_zero_bit that shall always be equal to 0 to prevent start code emulations. Without it, some MPEG systems might confuse the HEVC video bitstream with other data, but the 0 bit in the NAL unit header makes all possible HEVC bitstreams uniquely identifiable as HEVC bitstreams. The NAL unit header in VVC, shown in Table 1, is very similar to the one in HEVC, but uses 1 bit less for the nal_unit_type and instead reserves this bit for future use. The nal_unit_type, nuh_layer_id and nuh_temporal_id_plus1 code words specify the NAL unit type of the NAL unit that identifies what type of data is carried in the NAL unit, the scalability layer ID and the temporal layer ID for which the NAL unit belongs to. The NAL unit type indicates and specifies how the NAL unit should be parsed and decoded. The rest of the bytes of the NAL unit is payload of the type indicated by the NAL unit type. A bitstream consists of a series of concatenated NAL units. The syntax for the NAL unit header in VVC is shown in Table 1.

TABLE 1

NAL unit header syntax of VVC

| | Descriptor |
| --- | --- |
| nal_unit_header( ) { | |
|   forbidden_zero_bit | f(1) |
|   nuh_reserved_zero_bit | u(1) |
|   nuh_layer_id | u(6) |
|   nal_unit_type | u(5) |
|   nuh_temporal_id_plus1 | u(3) |
| } | |

A decoder or bitstream parser can conclude how the NAL unit should be handled, e.g., parsed and decoded, after looking at the NAL unit header. The rest of the bytes of the NAL unit is payload of the type indicated by the NAL unit type. All VVC or HEVC bitstreams consist of a series of concatenated NAL units.

The decoding order is the order in which NAL units shall be decoded, which is the same as the order of the NAL units within the bitstream. The decoding order may be different from the output order, which is the order in which decoded pictures are to be output, such as for display, by the decoder.

TABLE 2

NAL unit types in VVC

| nal_unit_type | Name of nal_unit_type | Content of NAL unit and RBSP syntax structure | NAL unit type class |
| --- | --- | --- | --- |
| 0 | TRAIL_NUT | Coded slice of a trailing picture or subpicture*slice_layer_rbsp( ) | VCL |
| 1 | STSA_NUT | Coded slice of an STSA picture or subpicture*slice_layer_rbsp( ) | VCL |

TABLE 2-continued

NAL unit types in VVC

| nal_unit_type | Name of nal_unit_type | Content of NAL unit and RBSP syntax structure | NAL unit type class |
|---|---|---|---|
| 2 | RADL_NUT | Coded slice of a RADL picture or subpicture*slice_layer_rbsp( ) | VCL |
| 3 | RASL_NUT | Coded slice of a RASL picture or subpicture*slice_layer_rbsp( ) | VCL |
| 4 . . . 6 | RSV_VCL_4 . . . RSV_VCL_6 | Reserved non-IRAP VCL NAL unit types | VCL |
| 7 | IDR_W_RADL | Coded slice of an IDR picture or subpicture*slice_layer_rbsp( ) | VCL |
| 8 | IDR_N_LP | | |
| 9 | CRA_NUT | Coded slice of a CRA picture or subpicture*silce_layer_rbsp( ) | VCL |
| 10 | GDR_NUT | Coded slice of a GDR picture or subpicture *slice_layer_rbsp( ) | VCL |
| 11 | RSV_IRAP_11 | Reserved IRAP VCL NAL unit types | VCL |
| 12 | RSV_IRAP_12 | | |
| 13 | DCI_NUT | Decoding capability information decoding_capability_information_rbsp( ) | non-VCL |
| 14 | VPS_NUT | Video parameter set video_parameter_set_rbsp( ) | non-VCL |
| 15 | SPS_NUT | Sequence parameter set seq_parameter_set_rbsp( ) | non-VCL |
| 16 | PPS_NUT | Picture parameter set pic_parameter_set_rbsp( ) | non-VCL |
| 17 | PREFIX_APS_NUT | Adaptation parameter set adaptation_parameter_set_rbsp( ) | non-VCL |
| 18 | SUFFIX_APS_NUT | | |
| 19 | PH_NUT | Picture header picture_header_rbsp( ) | non-VCL |
| 20 | AUD_NUT | AU delimiter access_unit_delimiter_rbsp( ) | non-VCL |
| 21 | EOS_NUT | End of sequence end_of_seq_rbsp( ) | non-VCL |
| 22 | EOB_NUT | End of bitstream end_of_bitstream_rbsp( ) | non-VCL |
| 23 | PREFIX_SEI_NUT | Supplemental enhancement information sei_rbsp( ) | non-VCL |
| 24 | SUFFIX_SEI_NUT | | |
| 25 | FD_NUT | Filler data filler_data_rbsp( ) | non-VCL |
| 26 | RSV_NVCL_26 | Reserved non-VCL NAL unit types | non-VCL |
| 27 | RSV_NVCL_27 | | |
| 28 . . . 31 | UNSPEC_28 . . . UNSPEC_31 | Unspecified non-VCL NAL unit types | non-VCL |

*indicates a property of a picture when pps_mixed_nalu_types_in_pic_flag is equal to 0 and a property of the subpicture when pps_mixed_nalu_types_in_pic_flag is equal to 1.

Scalability Layers

In VVC and HEVC, the value of the nuh_layer_id syntax element in the NAL unit header specifies the scalability layer ID to which a NAL unit belongs to. This enables associating NAL units and pictures with scalability layers that can be used for scalable coding.

Picture Unit, Access Unit and the Access Unit Delimiter

A picture unit (PU) in VVC is defined as a set of NAL units for which the VCL NAL units all belong to the same layer, that are associated with each other according to a specified classification rule, that are consecutive in decoding order, and that contain exactly one coded picture. In previous versions of VVC, the PU was called layer access unit. In HEVC, the PU is referred to as an access unit (AU).

In VVC, an access unit is a set of PUs that belong to different scalability layers and contain coded pictures associated with the same time for output from the decoded picture buffer (DPB), i.e. having the same POC value.

An access unit, in VVC, may start with an access unit delimiter (AUD) NAL unit which indicates the start of the access unit and the type of the slices allowed in the coded picture, i.e. I, I-P or I-P-B and whether the access unit is an IRAP or GDR access unit.

Layers, Dependent and Independent Layers

Layers are defined in VVC as a set of VCL NAL units that all have a particular value of nuh_layer_id and the associated non-VCL NAL units. In this disclosure, layers such as VVC layers are referred to as scalability layers.

A coded layer video sequence (CLVS) in VVC is defined as a sequence of PUs that consists, in decoding order, of a CLVS start (CLVSS) PU, followed by zero or more PUS that are not CLVSS PUs, including all subsequent PUs up to but not including any subsequent PU that is a CLVSS PU.

The relation between the PU, AU and CLVS is illustrated in FIG. 3.

In the VVC, scalability layers may be coded independently or dependently from each other. When the scalability layers are coded independently, a scalability layer with e.g. nuh_layer_id 0 may not predict video data from another scalability layer with e.g. nuh_layer_id 1. In VVC, dependent coding between scalability layers may be used, which enables support for scalable coding with SNR, spatial and view scalability.

In this disclosure, we use the term "scalability layer" when we refer to scalability layers such as SNR, spatial, view scalability that in HEVC and VVC are identified by layer ID values such as nuh_layer_id values.

Temporal Layers

In VVC and HEVC, all pictures are associated with a TemporalId value which specifies what temporal layer the picture belongs to. TemporalId values are decoded from the nuh_temporal_id_plus1 syntax element in the NAL unit header. The encoder is required to set TemporalId values such that pictures belonging to a lower temporal layer is perfectly decodable when higher temporal layers are discarded. Assume for instance that an encoder has output a bitstream using temporal layers 0, 1 and 2. Then removing all temporal layer 2 NAL units or removing all layer 1 and 2 NAL units will result in bitstreams that can be decoded without problems. This is ensured by restrictions in the HEVC specification that the encoder must comply with. For instance, it is not allowed for a picture of a temporal layer to reference a picture of a higher temporal layer.

In this disclosure we use the term "temporal layer" when we refer to temporal layers as traditionally used in HEVC. The term "layer" in this disclosure may refer to temporal layers, or scalability layers, or the combination of temporal layers and scalability layers.

Slices

The concept of slices in HEVC divides the picture into independently coded slices, where decoding of one slice in a picture is independent of other slices of the same picture. Different coding types could be used for slices of the same picture, i.e. a slice could either be an I-slice, P-slice or B-slice. One purpose of slices is to enable resynchronization in case of data loss. In HEVC, a slice is a set of CTUs.

In VVC, a picture may be partitioned into either raster scan slices or rectangular slices. A raster scan slice consists of a number of complete tiles in raster scan order. A rectangular slice consists of a group of tiles that together occupy a rectangular region in the picture or a consecutive number of CTU rows inside one tile. Each slice has a slice header comprising syntax elements. Decoded slice header values from these syntax elements are used when decoding the slice. Each slice is carried in one VCL NAL unit.

In a previous version of the VVC draft specification, slices were referred to as tile groups.

Picture Header

VVC includes a picture header, which is a NAL unit having nal_unit_type equal to PH_NUT. The picture header is similar to the slice header, but the values of the syntax elements in the picture header are used to decode all slices of one picture. Each picture in VVC consist of one picture header NAL unit followed by all coded slices of the picture where each coded slice is conveyed in one coded slice NAL unit.

Intra Random Access Point (IRAP) Pictures and the Coded Video Sequence (CVS)

For single scalability layer coding in HEVC, an access unit (AU) is the coded representation of a single picture. An AU may consist of several video coding layer (VCL) NAL units as well as non-VCL NAL units.

An intra random access point (IRAP) picture in HEVC is a picture that does not refer to any pictures other than itself for prediction in its decoding process. The first picture in the bitstream in decoding order in HEVC must be an IRAP picture but an IRAP picture may additionally also appear later in the bitstream. HEVC specifies three types of IRAP pictures, the broken link access (BLA) picture, the instantaneous decoder refresh (IDR) picture and the clean random access (CRA) picture.

A coded video sequence (CVS) in HEVC is a sequence of access units starting at an IRAP access unit followed by zero or more AUs up to, but not including the next IRAP access unit in decoding order.

IDR pictures always start a new CVS. An IDR picture may have associated random access decodable leading (RADL) pictures. An IDR picture does not have associated random access skipped leading (RASL) pictures.

BLA picture in HEVC also starts a new CVS and has the same effect on the decoding process as an IDR picture. However, a BLA picture in HEVC may contain syntax elements that specify a non-empty set of reference pictures. A BLA picture may have associated RASL pictures, which are not output by the decoder and may not be decodable, as they may contain references to pictures that may not be present in the bitstream. A BLA picture may also have associated RADL pictures, which are decoded. BLA pictures are not included in VVC.

A CRA picture may have associated RADL or RASL pictures. As with a BLA picture, a CRA picture may contain syntax elements that specify a non-empty set of reference pictures. For CRA pictures, a flag can be set to specify that the associated RASL pictures are not output by the decoder, because they may not be decodable, as they may contain references to pictures that are not present in the bitstream. A CRA may or may not start a CVS.

In VVC, a CVS is a sequence of access units starting at a CVS start (CVSS) access unit followed by zero or more AUs up to, but not including the next CVSS access unit in decoding order. A CVSS access unit may contain an IRAP picture, i.e, an IDR or a CRA picture, or a gradual decoding refresh (GDR) picture. A CVS may contain one or more CLVSs.

GDR pictures are essentially used for random access in bitstreams encoded for low-delay coding where a full IRAP picture would cause too much delay. A GDR picture may use gradual intra refresh that updates the video picture by picture where each picture is only partially intra coded. A recovery POC count is signaled with the GDR picture that specifies when the video is fully refreshed and ready for output, given that the bitstream was tuned in at the GDR picture. A GDR picture in VVC may start a CVS or CLVS. GDR pictures are included as a normative feature in VVC but are not a normative part of the HEVC standard, where it instead may be indicated with an SEI message.

Parameter Sets

VVC and HEVC specifies three types of parameter sets, the picture parameter set (PPS), the sequence parameter set (SPS) and the video parameter set (VPS). The PPS contains data that is common for a whole picture, the SPS contains data that is common for a coded video sequence (CVS), and the VPS contains data that is common for multiple CVSs, e.g. data for multiple scalability layers in the bitstream.

VVC also specifies one additional parameter set, the adaptation parameter set (APS). APS carries parameters needed for the adaptive loop filter (ALF) tool, the luma mapping and chroma scaling (LMCS) tool, and the scaling list tool. The APS may contain information that can be used for multiple slices and two slices of the same picture can use different APSes. Both VVC and HEVC allow certain information (e.g. parameter sets) to be provided by external means. By "external means" should be interpreted as the information is not provided in the coded video bitstream but by some other means not specified in the video codec specification, e.g. via metadata possibly provided in a different data channel or as a constant in the decoder.

Decoding Capability Information (DCI)

DCI specifies information that may not change during the decoding session and may be good for the decoder to know about, e.g. the maximum number of allowed sub-layers. The information in DCI is not necessary for operation of the decoding process. In early drafts of the VVC specification the DCI was called decoding parameter set (DPS).

The decoding capability information also contains a set of general constraints for the bitstream, that gives the decoder information of what to expect from the bitstream, in terms of coding tools, types of NAL units, etc. In VVC, the general constraint information could also be signaled in VPS or SPS.

Picture Order Count (POC)

Pictures in HEVC are identified by their picture order count (POC) values, also known as full POC values. Both encoder and decoder keep track of POC and assign POC values to each picture that is encoded/decoded. Decoded pictures are output in increasing POC order which means that the POC values represents the output order. The picture order count value of a picture is called PicOrderCntVal in HEVC. Usually, PicOrderCntVal for the current picture is simply called PicOrderCntVal.

Reference Picture Resampling (RPR)

RPR is a new feature in VVC that does not exist in HEVC. In HEVC, all pictures of a layer have the same spatial resolution. In VVC however, pictures belonging to the same layer could have different spatial resolution. The spatial resolution (width and height) of a picture is signaled in the PPS in VVC. When the current picture and a reference picture have different spatial resolutions, RPR enables the reference picture to be used for prediction of the current picture by scaling the reference picture to the same spatial resolution as the current picture before prediction. RPR may be used for pictures belonging to the same layer or different layers.

SEI Messages

Supplementary Enhancement Information (SEI) messages are codepoints in the coded bitstream that do not influence the decoding process of coded pictures from VCL NAL units. SEI messages usually address issues of representation/rendering of the decoded bitstream. The overall concept of SEI messages and many of the messages themselves have been inherited from the H.264 and HEVC specifications into VVC specification. In VVC, an SEI RBSP contains one or more SEI messages.

SEI message syntax table describing the general structure of an SEI message in VVC is shown in Table 3. The type of each SEI message is identified by its payload type.

TABLE 4

SEI message syntax table in VVC

|  | Descriptor |
| --- | --- |
| sei_message( ) { |  |
|   payloadType = 0 |  |
|   do { |  |
|     payload_type_byte | u(8) |
|     payloadType += payload_type_byte |  |
|   } while( payload_type_byte = = 0xFF ) |  |
|   payloadSize = 0 |  |
|   do { |  |
|     payload_size_byte | u(8) |
|     payloadSize += payload_size_byte |  |
|   } while( payload_size_byte = = 0xFF ) |  |
|   sei_payload( payloadType, payloadSize ) |  |
| } |  |

Annex D in VVC specification, specifies syntax and semantics for SEI message payloads for some SEI messages, and specifies the use of the SEI messages and VUI parameters for which the syntax and semantics are specified in ITU-T H.SEI|ISO/IEC 23002-7. The SEI payload structure in Annex D listing the SEI messages supported in VVC version 1 is shown in Table 4.

TABLE 5

SEI payload structure

|  | Descriptor |
| --- | --- |
| sei_payload( payloadType, payloadSize ) { |  |
|   if( nal_unit_type = = PREFIX_SEI_NUT ) |  |
|     if( payloadType = = 0 ) |  |
|       buffering_period( payloadSize ) |  |
|     else if( payloadType = = 1 ) |  |
|       pic_timing( payloadSize ) |  |
|     else if( payloadType = = 3 ) |  |
|       filler_payload( payloadSize ) /* Specified in Rec. ITU-T H.274 \| ISO/IEC 23002-7 */ |  |
|     else if( payloadType = = 4 ) /* Specified in Rec. ITU-T H.274 \| ISO/IEC 23002-7 */ |  |
|       user_data_registered_itu_t_t35( payloadSize ) |  |
|     else if( payloadType = = 5 ) /* Specified in Rec. ITU-T H.274 \| ISO/IEC 23002-7 */ |  |
|       user_data_unregistered( payloadSize ) |  |
|     else if( payloadType = = 19 ) /* Specified in Rec. ITU-T H.274 \| ISO/IEC 23002-7 */ |  |
|       film_grain_characteristics( payloadSize ) |  |
|     else if( payloadType = = 45 ) /* Specified in Rec. ITU-T H.274 \| ISO/IEC 23002-7 */ |  |
|       frame_packing_arrangement( payloadSize ) |  |
|     else if( payloadType = = 129 ) /* Specified in Rec. ITU-T H.274 \| ISO/IEC 23002-7 */ |  |
|       parameter_sets_inclusion_indication( payloadSize ) |  |
|     else if( payloadType = = 130 ) |  |
|       decoding_unit_info( payloadSize ) |  |
|     else if( payloadType = = 133 ) |  |
|       scalable_nesting( payloadSize ) |  |
|     else if( payloadType = = 137 ) /* Specified in Rec. ITU-T H.274 \| ISO/IEC 23002-7 */ |  |
|       mastering_display_colour_volume( payloadSize ) |  |
|     else if( payloadType = = 144 ) /* Specified in Rec. ITU-T H.274 \| ISO/IEC 23002-7 */ |  |
|       content_light_level_info( payloadSize ) |  |
|     else if( payloadType = = 145 ) /* Specified in Rec. ITU-T H.274 \| ISO/IEC 23002-7 */ |  |
|       dependent_rap_indication( payloadSize ) |  |
|     else if( payloadType = = 147 ) /* Specified in Rec. ITU-T H.274 \| ISO/IEC 23002-7 */ |  |
|       alternative_transfer_characteristics( payloadSize ) |  |
|     else if( payloadType = = 148 ) /* Specified in Rec. ITU-T H.274 \| ISO/IEC 23002-7 */ |  |
|       ambient_viewing_environment( payloadSize ) |  |
|     else if( payloadType = = 149 ) /* Specified in Rec. ITU-T H.274 \| ISO/IEC 23002-7 */ |  |
|       content_colour_volume( payloadSize ) |  |
|     else if( payloadType = = 150 ) /* Specified in Rec. ITU-T H.274 \| ISO/IEC 23002-7 */ |  |
|       equirectangular_projection( payloadSize ) |  |
|     else if( payloadType = = 153 ) /* Specified in Rec. ITU-T H.274 \| ISO/IEC 23002-7 */ |  |
|       generalized_cubemap_projection( payloadSize ) |  |
|     else if( payloadType = = 154 ) /* Specified in Rec. ITU-T H.274 \| ISO/IEC 23002-7 */ |  |
|       sphere_rotation( payloadSize ) |  |
|     else if( payloadType = = 155 ) /* Specified in Rec. ITU-T H.274 \| ISO/IEC 23002-7 */ |  |
|       regionwise_packing( payloadSize ) |  |
|     else if( payloadType = = 156 ) /* Specified in Rec. ITU-T H.274 \| ISO/IEC 23002-7 */ |  |
|       omni_viewport( payloadSize ) |  |
|     else if( payloadType = = 168 ) /* Specified in Rec. ITU-T H.274 \| ISO/IEC 23002-7 */ |  |
|       frame_field_info( payloadSize ) |  |
|     else if( payloadType = = 203 ) |  |
|       subpic_level_info( payloadSize ) |  |
|     else if( payloadType = = 204 ) /* Specified in Rec. ITU-T H.274 \| ISO/IEC 23002-7 */ |  |
|       sample_aspect_ratio_info( payloadSize ) |  |
|     else /* Specified in Rec. ITU-T H.274 \| ISO/IEC 23002-7 */ |  |
|       reserved_message( payloadSize ) |  |

TABLE 5-continued

SEI payload structure

| | Descriptor |
|---|---|
| else /* nal_unit_type = = SUFFIX_SEI_NUT */ | |
|   if( payloadType = = 3 ) /* Specified in Rec. ITU-T H.274 \| ISO/IEC 23002-7 */ | |
|     filler_payload( payloadSize ) | |
|   if( payloadType = = 132 ) /* Specified in Rec. ITU-T H.274 \| ISO/IEC 23002-7 */ | |
|     decoded_picture_hash( payloadSize ) | |
|   else if( payloadType = = 133 ) | |
|     scalable_nesting( payloadSize ) | |
|   else  /* Specified in Rec. ITU-T H.274 \| ISO/IEC 23002-7 */ | |
|     reserved_message( payloadSize ) | |
| if( more_data_in_payload( ) ) { | |
|   if( payload_extension_present( ) ) | |
|     sei_reserved_payload_extension_data | u(v) |
|   sei_payload_bit_equal_to_one /* equal to 1 */ | f(1) |
|   while( !byte_aligned( ) ) | |
|     sei_payload_bit_equal_to_zero /* equal to 0 */ | f(1) |
| } | |
| } | |

SEI messages assist in processes related to decoding, display or other purposes. However, SEI messages are not required for constructing the luma or chroma samples by the decoding process. Some SEI messages are required for checking bitstream conformance and for output timing decoder conformance. Other SEI messages are not required for checking bitstream conformance. A decoder is not required to support all SEI messages. Usually, if a decoder encounters an unsupported SEI message, it is discarded.

ITU-T H.274 | ISO/IEC 23002-7, also referred to as VSEI, specifies the syntax and semantics of SEI messages and is particularly intended for use with coded video bitstreams, although it is written in a manner intended to be sufficiently generic that it may also be used with other types of coded video bitstreams. The first version of ITU-T H.274 | ISO/IEC 23002-7 was finalized in July 2020. At the time of writing, version 2 is under development. JVET-U2006-v1 is the current draft for version 2 that specifies additional SEI messages for use with coded video bitstreams.

The persistence of an SEI message indicates the pictures to which the values signalled in the instance of the SEI message may apply. The part of the bitstream that the values of the SEI message may apply to are referred to as the persistence scope of the SEI message.

Scalable Nesting SEI Message

The scalable nesting SEI message in VVC provides a mechanism to associate SEI messages with specific OLSs, specific layers, or specific sets of subpictures. A scalable nesting SEI message contains one or more SEI messages. The SEI messages contained in the scalable nesting SEI message are also referred to as the scalable-nested SEI messages.

The scalable nesting SEI message syntax in VVC is shown in Table 5.

TABLE 6

Scalable nesting SEI message syntax in VVC

| | Descriptor |
|---|---|
| scalable_nesting( payloadSize ) { | |
|   sn_ols_flag | u(1) |
|   sn_subpic_flag | u(1) |
|   if( sn_ols_flag ) { | |

TABLE 6-continued

Scalable nesting SEI message syntax in VVC

| | Descriptor |
|---|---|
|     sn_num_olss_minus1 | ue(v) |
|     for( i = 0; i <= sn_num_olss_minus1; i++ ) | |
|       sn_ols_idx_delta_minus1[ i ] | ue(v) |
|   } else { | |
|     sn_all_layers_flag | u(1) |
|     if( !sn_all_layers_flag ) { | |
|       sn_num_layers_minus1 | ue(v) |
|       for( i = 1; i <= sn_num_layers_minus1; i++ ) | |
|         sn_layer_id[ i ] | u(6) |
|     } | |
|   } | |
| if( sn_subpic_flag ) { | |
|     sn_num_subpics_minus1 | ue(v) |
|     sn_subpic_id_len_minus1 | ue(v) |
|     for( i = 0; i <= sn_num_subpics_minus1; i++ ) | |
|       sn_subpic_id[ i ] | u(v) |
|   } | |
|   sn_num_seis_minus1 | ue(v) |
|   while( !byte_aligned( ) ) | |
|     sn_zero_bit /* equal to 0 */ | u(1) |
|   for( i = 0; i <= sn_num_seis_minus1; i++ ) | |
|     sei_message( ) | |
| } | |

Film Grain

Adding Noise or Film Grain after Decoding Pictures

Noise in video originates from different sources. This noise can be suppressed by the encoder at the earliest stage of the process. When the picture is reconstructed at the decoder before display, a modelled or an unmodelled noise can be added in one way or another to the decoded frame. Different objectives have been introduced that manifests the subjective quality increase by adding noise which, as a result of increase in picture resolution, has now become more apparent. The first reason to add noise might be to introduce artistic effects e.g. while shooting documentaries, portraits, black and white scenes, to capture reality, or to get the "real cinema effect" for movies. The second reason is to hide coding artifacts such as blurriness, blocking and banding effects appeared due to the heavy encoding procedure in the encoder.

Film Grain Characteristics SEI Message in VVC

A film grain process is specified in the VSEI specification and supported by VVC. This process is essentially identical to the film grain processes specified in the H.264/AVC and HEVC video coding standards. The process includes an SEI message that carries a parametrized model for film grain synthesis in the decoder.

The film grain characteristic SEI message includes a cancel flag, film_grain_characteristics_cancel_flag, which enables the film grain process if it is set equal to 0. Also, when the flag is set to 0, film grain parameter syntax elements follow the flag. At last, film_grain_characteristics_persistence_flag specifies the persistence of the film grain characteristic SEI message for the current layer. In Table 6 below, a simplified version of the syntax is shown.

TABLE 7

Film grain characteristics SEI message syntax in VVC

| | Descriptor |
|---|---|
| film_grain_characteristics(payloadSize) { | |
|   film_grain_characteristics_cancel_flag | u(1) |
|   if ( !film_grain_characteristics_cancel_flag ) { | |

TABLE 7-continued

Film grain characteristics SEI message syntax in VVC

| | Descriptor |
|---|---|
| film_grain_mode_id | u(2) |
| separate_colour_description_present_flag | u(1) |
| if (separate_colour_description_present_flag) { | |
|    color_specific_parameters( ) | |
| } | |
|    more_film_grain_parameters( ) | |
|    film_grain_characteristics_persistence_flag | u(1) |
| } | |

Normative Film Grain

In JVET-Q0424 a normative film grain generation process was proposed for VVC. The contribution proposed to signal the film grain parameters in an APS and to include a film grain seed in the picture header to make the film grain process pseudo-random and deterministic.

LMCS

Luma mapping with chroma scaling (LMCS) is an in-loop filtering process in VVC that allows adapting the signal dynamically depending on its codewords statistics. The parameters for the in-loop LMCS is signaled in APSs with a specific APS ID. The LMCS APS ID is referenced from the picture headers. In-loop LMCS allows storing in the DPB the pictures in their original (non-mapped) format. LMCS can be adaptively enabled or enabled depending on the picture type.

In JVET-U0078 it was proposed to signal LMCS out-of-loop either with normative signaling in the parameter sets or as an SEI message.

SUMMARY

The parameter sets in VVC and HEVC provide a flexible and compression efficient way of referencing syntax elements that apply to a certain part of the bitstream. For instance, each picture references a PPS using a specific PPS ID, and each picture and/or slice may further reference one or more APSs using their APS IDs. The parameter set IDs bring a flexibility that allows to not have to repeat the syntax elements of the parameter sets when multiple parameter sets are used in the bitstream.

The same flexibility does not exist for SEI messages. The persistence scope for an SEI is typically for the current picture or for the current picture and all following pictures until it is replaced by new version of the SEI message. For SEI messages that are not necessarily always applied to each picture for a set of consecutive pictures, the current persistence scheme is not very coding efficient. For instance, as illustrated in FIG. 4, when two versions of an SEI message (i.e. two SEI messages of the same type comprising different values for the syntax elements) are to be applied alternatingly, each one applied respectively for every second picture, a full SEI message must be sent for each picture, although the SEI messages for each of the two versions are identical.

In general, parameter sets comprise syntax elements that are mandatory for a decoder conforming to the specification to support. SEI messages on the other hand are optional for a decoder to support and the content of SEI messages may therefore not be suitable to signal in parameter sets. Moreover, adding syntax elements specifying a functionality to a normative parameter set is not possible without creating a new profile for the codec. Creating a new profile may cause market fragmentation and should not be done unless there is a strong market need for a new profile.

One aspect of embodiments is to provide a referencing mechanism for messages (e.g., SEI messages) in order to reduce the bit cost when different versions of messages (e.g., SEI messages) are used in an arbitrary manner in the bitstream, e.g. in an alternating way in the bitstream. In embodiments, two SEI messages are used to express a functionality. In the first SEI message, syntax elements specifying the functionality is provided. The first SEI message may also have an identifier value, which uniquely identifies the instance of that particular SEI message. The second SEI message, typically much smaller and sent more frequently than the first SEI message, is used to reference the first SEI message in order to apply the functionality of the first SEI message to a part of the bitstream determined by the persistence scope of the second SEI message, e.g. for the picture or subpicture it was sent with.

An advantage of some embodiments is that they provide a mechanism to reference an instance of a first message (e.g., a first SEI message) that specifies a certain functionality from a second, and typically significantly smaller, message (e.g., a second SEI message), such that the first message does not need to be repeated when different versions of the message are applied in an arbitrary way (e.g., in an alternating way) in the bitstream.

In the prior art solutions, you may need to send an SEI message with a certain functionality for every picture. The benefit in some embodiments herein disclosed is that you do not need to repeat the functionality of the message (e.g., SEI message) all the time. It is also possible to have several first messages to link to more than one version of the functionality.

For conventional SEI messages, if the SEI message is to be used for many segments in the bitstream, but not all, the SEI message may have to be repeated several times, which may have a large cost in bits if the SEI message carries a lot of information. For instance, the content color volume SEI message specified in the VSEI specification may in the worst case need to send 37 bytes every picture.

Embodiments allow you not to have to repeat the functionality information of a message (e.g., an SEI message) when not needed. This saves bits and also provides flexibility of where to apply the functionality. The functionality may for instance be applied to any subset of pictures or subpictures in the bitstream in a flexible way.

The information conveyed in an SEI message does not impact the decoding process and may in general be ignored by the core decoder. Information conveyed in a parameter set is normative and typically impacts the decoding process. Thus, information suitable for an SEI message may not be suitable for a parameter set. One benefit of having an SEI message compared to a parameter set is that you could add functionality to an existing specification without having to add a new profile. An SEI message may be added to a specification without having to add a new profile. A decoder conforming to a profile described in a first version of the specification may use an SEI message specified in an updated version of the specification. A benefit of the generic version of the solution would also work for previously specified SEI messages not having a unique identifier.

Another benefit of having an SEI message compared to a parameter set is that new functionality can be added later to an already finalized specification. For example, for VVC version 1, there will be no further normative additions such as added signaling in the parameter sets, whereas a VVC version 1 decoder may decide to support SEI messages that were added to the VVC specification after the VVC version 1 specification was finalized.

BRIEF DESCRIPTION OF THE DRAWINGS

The accompanying drawings, which are incorporated herein and form part of the specification, illustrate various embodiments.

DETAILED DESCRIPTION

It is to be understood by a person skilled in the art that the embodiments below may be combined to form solutions that are not explicitly defined, but still covered by the invention.

Figure 1:
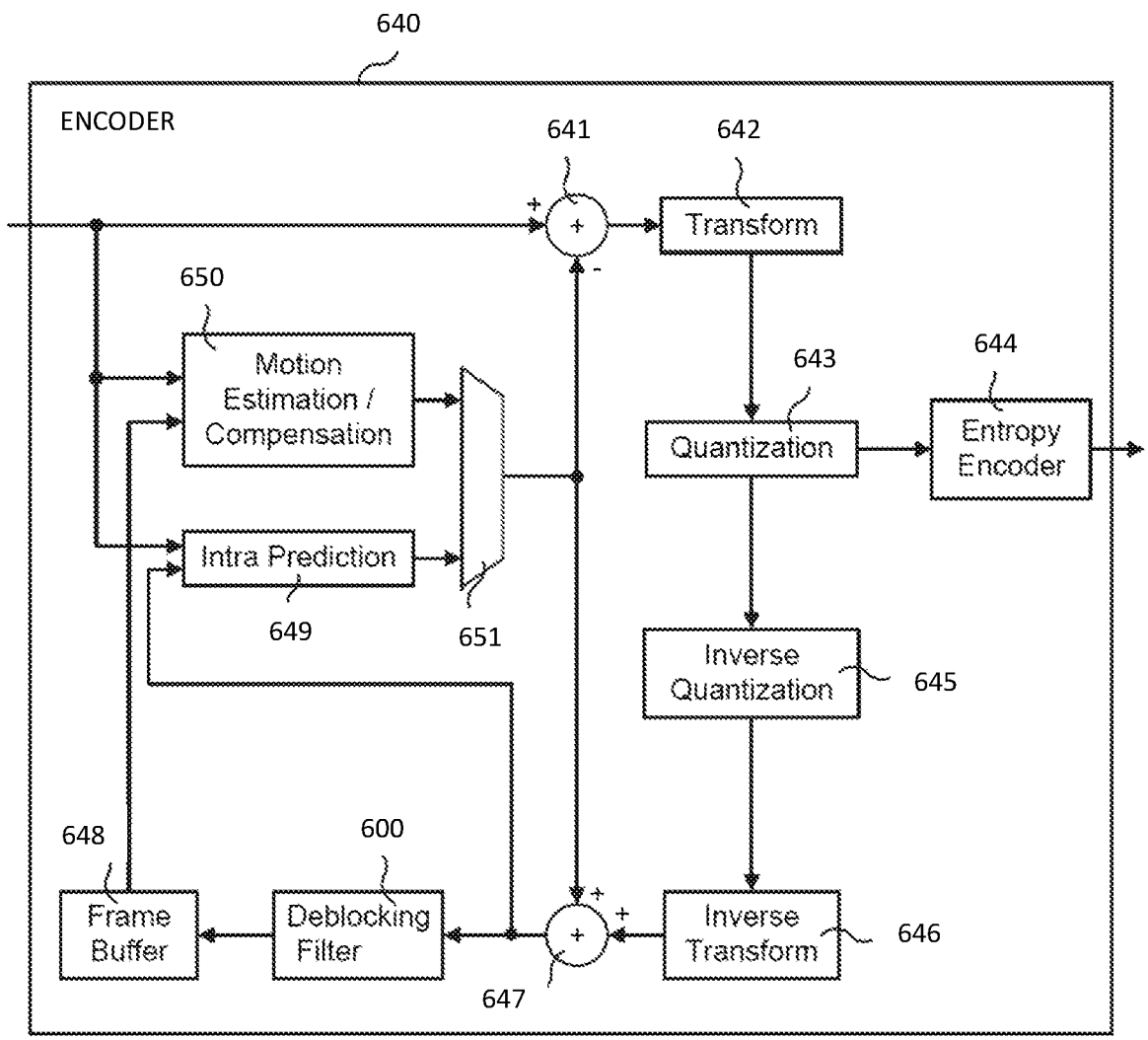
FIG. 1 is an example architecture of an encoder according to an embodiment.
Figure 2:
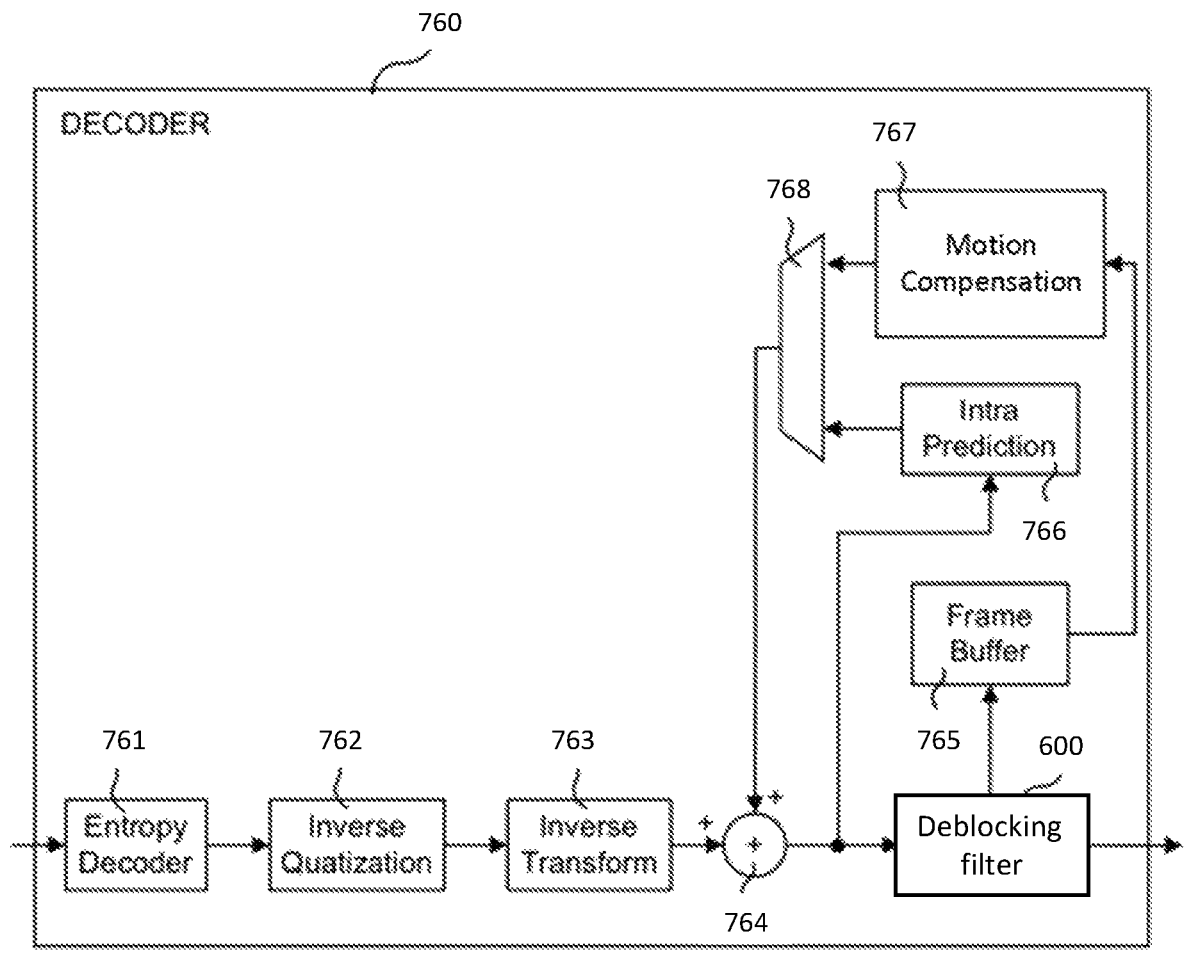
FIG. 2 is an example architecture of a decoder according to an embodiment.
Figure 3:
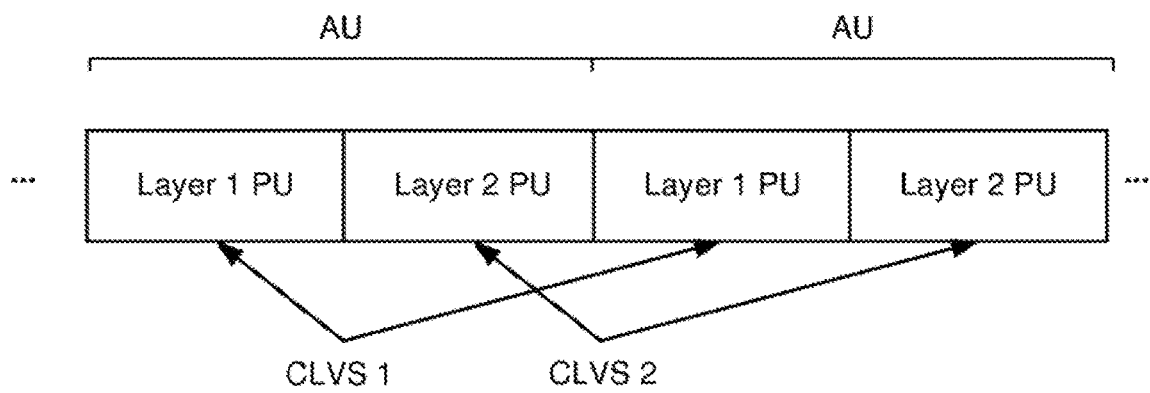
FIG. 3 illustrates the relationship between the PU, AU and CVLS.

Embodiments may be applicable to both an encoder and a decoder, as well as to components of an encoder or decoder that may be deployed locally or remotely from the respective encoder or decoder. An exemplary encoder is shown in FIG. 1. An exemplary decoder is shown in FIG. 2.

Embodiment 1—General Method

Figure 5:
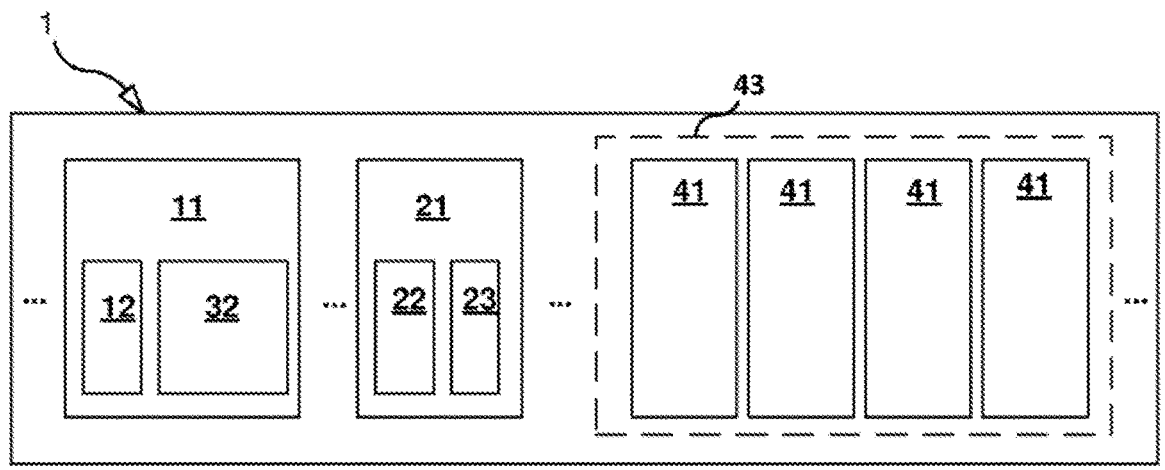
FIG. 5 is an exemplary bitstream according to an embodiment.

FIG. 5 illustrates an exemplary bitstream according to an embodiment. An encoder may encode a bitstream such as that illustrated in FIG. 5, and a decoder may decode a bitstream such as that illustrated in FIG. 5. The first embodiment described here is generalized to be applicable to different types of packets, including where the packet types are SEI messages or other packet types. In this embodiment, a video bitstream 1 comprises a set of coded pictures. Two packets are used for applying a certain functionality, first packet 11 and second packet 21. The first packet 11 comprises one or more syntax elements providing information for the functionality (i.e. functionality information 32) and an identifier 12 that identifies the specific packet and/or functionality information. The second packet 21, which is typically sent more frequently than the first packet, e.g. for each picture or even subpicture or slice, comprises a reference identifier 22 (or reference ID 22) to the first packet and/or functionality information and specifies one or more segments 41, signaled in a third packet 43, for which the specific functionality is to be applied. In some embodiments, second packet 21 may also include additional information 23, such as light-weight controls regarding the specific functionality to be applied. In one embodiment, the one or more segments 41 that the functionality information 32 is to be applied to are signaled in a third packet 43. In another embodiment, only a part of a segment 41 is signaled in the third packet 43.

One aspect of the embodiment is not to have to repeat the functionality information of the first packet (which is potentially a lot of bits) when not needed, but to be able to reference that functionality information in later packets. This saves bits and provides flexibility of where to apply the functionality. The functionality may for instance be applied to any subset of pictures or subpictures in the bitstream in a flexible way.

Description of Packets, Packet Types, Segments and Functionality Information

Any or all of the packets in this embodiment (e.g., first, second, and third packets) may be a NAL unit. The first and second packets, in some embodiments, are non-VCL NAL units and the packet type of the first and second packets may, for example, both be SEI messages. In the text below, the packets are referred to as SEI messages, but it is to be understood that the packets may be any type of packet and the description below referring to SEI messages could also apply to any type of packet. In some embodiments, the first and second packets may be the same type, and in other embodiments they may be different types. For instance, the type of the first packet may be a parameter set, such as an SPS, a PPS or an APS, while the type of the second packet may be an SEI message. In the text below the second packet is often referred to as the referencing SEI message and the first packet is often referred to as the functionality information SEI message referenced by the referencing SEI message, however the description is generally applicable to other packet types.

In some embodiments, the third packet is a VCL NAL unit and the packet type of the third packet is a slice type. A segment may, for instance, be a picture, a subpicture, a slice, a tile, or a CTU.

The functionality information may, for instance, be syntax elements specifying any type of functionality that can be carried in an SEI message or parameter set, such as film grain parameters, LMCS parameters, mastering display color volume parameters, content light level parameters, ambient viewing environment parameters, content color volume parameters, sphere rotation parameters, region-wise packing parameters, omni-directional viewport parameters, sample aspect ratio parameters, annotated regions parameters, scalability dimension parameters, multiview acquisition parameters, and depth representation parameters. These parameters may include model descriptions such as a filter model type, filter strengths, and so on.

Applying a functionality to a segment based on the functionality information may comprise using the parameter values to modify a segment or attach information to a segment according to a specification. This may, for example, include applying film grain noise to a segment, applying LMCS out-of-loop to a segment, or modifying display color volume, content light levels, ambient viewing or content color volume to a segment, apply geometric transformations or displacements of segments such as sphere rotation, region-wise packing, sample aspect ratio transformation, or attach information to a segment such as omni-directional viewport info, annotated regions info, scalability dimension info, multiview acquisition info, and depth representation info.

Functionality information can alternatively, or additionally, in this disclosure be interpreted as parameter values or syntax element values. The use of such functionality information in this disclosure can be seen as parameter referencing, where the reference identifier is used to reference the parameters instead of decoding the parameters or syntax elements from the segments.

Using Two Types of SEI Messages

The tables below show example syntax for using two different types of SEI messages for the first embodiment.

|  | Descriptor |
|---|---|
| functionality_information_sei ( payloadSize ) { | |
|    functionality_information_id | u(8) |
|    ... | |
|    functionality_information( ) | |
| } | |

|  | Descriptor |
|---|---|
| referencing_sei ( payloadSize ) { | |
|    referenced_functionality_information_id | u(8) |
|    ... | |
| } | |

The first SEI message is the SEI message carrying the functionality information. An instance of the SEI message is uniquely identified using the functionality_information_id. The functionality_information( ) in the syntax table represents the syntax elements used to specify the functionality. Details of the syntax elements in the functionality information is out of the scope for this disclosure. Two functionality information SEI messages with different functionality_information_id may have different values for the syntax elements in the functionality information. The second SEI message is the SEI message referencing the functionality information SEI message using the referenced_functionality_information_id, and that specifies the one or more segments for which the functionality is to be applied. The referencing SEI message may also comprise one or a few syntax elements for light-weight control of the functionality specified in the functionality information SEI message.

Figure 6:
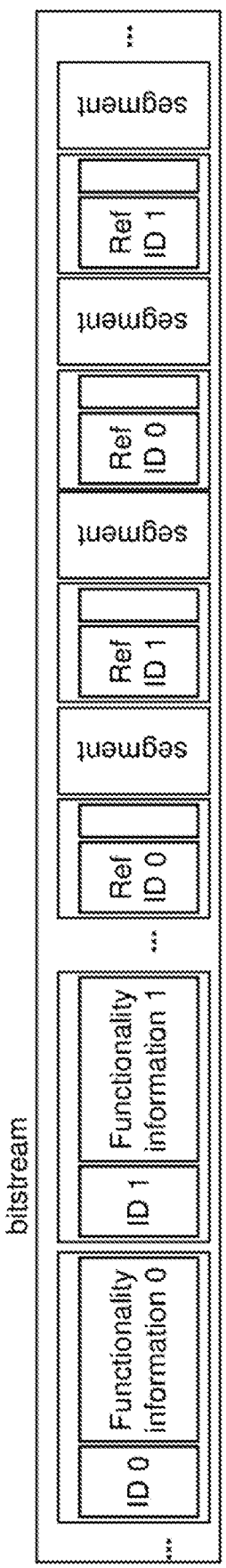
FIG. 6 is an exemplary bitstream according to an embodiment.

FIG. 6 illustrates an exemplary bitstream according to an embodiment. An encoder may encode a bitstream such as that illustrated in FIG. 6, and a decoder may decode a bitstream such as that illustrated in FIG. 6. As shown in FIG. 6, a bitstream may include two functionality information SEI messages with different identifier values and a number of referencing SEI messages (four are shown) each associated with a segment, each reference SEI message referencing one of the functionality information SEI messages such that each unique functionality information is not repeated in the bitstream.

As illustrated in FIG. 6 an encoder may encode the functionality information SEI messages in the beginning of the bitstream. An encoder may also choose to encode the functionality information SEI messages when there is a need to do so. The encoder may for instance follow these steps:

a. Determine a functionality to be used for a segment
b. If a suitable functionality information SEI message with a first identifier value (e.g. 0) specifying the functionality has already been signaled in the bitstream,
   i. encode a reference SEI message with reference ID value corresponding to the first identifier value to the bitstream
   ii. encode the segment to the bitstream c. Otherwise,
   i. encode a suitable functionality information SEI message with a new identifier value (e.g. 1) to the bitstream
   ii. encode a reference SEI message with reference ID value corresponding to the new identifier value to the bitstream
   iii. encode the segment to the bitstream In one version of the embodiment the identifier value may be signaled with a fixed number of bits, such as 8, like in the example syntax table above. In another version of the embodiment the number of bits used for signaling the identifier is signaled in a syntax element in the SEI message. This is illustrated in the example syntax below where the syntax element id_len_minus_1+1 specifies the number of bits used for signaling the functionality_information_id syntax element representing the identifier value. In another version of the embodiment the identifier value is signaled with a non-fixed number of bits such as an unsinged integer 0-th order Exp-Golomb-coded syntax element denoted ue(v).

|  | Descriptor |
|---|---|
| functionality_information_sei ( payloadSize ) { | |
|    id_len_minus_1 | u(3) |
|    functionality_information_id | u(v) |
|    ... | |
|    functionality_information( ) | |
| } | |

|  | Descriptor |
|---|---|
| referencing_sei ( payloadSize ) { | |
|    id_len_minus_1 | u(3) |
|    referenced_functionality_information_id | u(v) |
|    ... | |
| } | |

Persistence Scope of the Referencing SEI Message

The persistence scope of a referencing SEI message, i.e. to what set of segments to apply the functionality of the functionality information SEI message, may be defined explicitly in the specification. For instance, the specification may say that the persistence of a referencing SEI message is the access unit (AU) containing the SEI message. The specification may also say that the persistence of a referencing SEI message is the picture unit (PU) containing the SEI message or alternatively that the persistence of a referencing SEI message is the slice following the SEI message or alternatively that the persistence of a referencing SEI message is the subpicture for which the slice following the SEI message belongs to.

The persistence scope of a referencing SEI message may also be specified using one or more syntax elements in the SEI message. For instance, the referencing SEI may follow the persistence structure commonly used in the VSEI specification with a persistence flag and a cancel flag. The following example syntax and semantics below illustrate the signaling of the persistence scope of a referencing SEI message.

| | Descriptor |
|---|---|
| referencing_sei ( payloadSize ) { | |
|   referenced_functionality_information_id | u(8) |
|   referencing_sei_cancel_flag | u(1) |
|   if ( !referencing_sei_cancel_flag ) { | u(1) |
|     referencing_sei_persistence_flag | u(1) |
|     ... | |
|   } | |
| } | | referencing_sei_cancel_flag equal to 1 indicates that the SEI message cancels the persistence of any previous referencing SEI message in output order with referenced_functionality_information_id equal to referenced_functionality_information_id of the current referencing SEI message. referencing_sei_cancel_flag equal to 0 indicates that referencing SEI message information follows.

referencing_sei_persistence_flag specifies the persistence of the referencing SEI message for the current layer.

referencing_sei_persistence_flag equal to 0 specifies that the referencing SEI message applies to the current decoded picture only.

referencing_sei_persistence_flag equal to 1 specifies that the referencing SEI message applies to the current decoded picture and persists for all subsequent pictures of the current layer in output order until one or more of the following conditions are true:

A new CLVS of the current layer begins.

The bitstream ends.

A picture in the current layer in an AU associated with a referencing SEI message, with referenced_functionality_information_id equal to referenced_functionality_information_id of the current referencing SEI message, is output that follows the current picture in output order.

Another example of how to signal the scope of the referencing SEI message is shown below, where the scope of the SEI message may be for the picture associated with the referencing SEI message or for a set of subpictures of that picture. In one version of the embodiment, and as illustrated in the example syntax below, a previous referencing SEI message is canceled/overwritten only if the referenced_functionality_information_id has the same value in the current referencing SEI message as in the previous referencing SEI message. In another version of the embodiment the referenced_functionality_information_id of the current and previous referencing SEI message do not need to have the same value for the previous referenced SEI message to be canceled/overwritten.

| | Descriptor |
|---|---|
| referencing_sei ( payloadSize ) { | |
|   referenced_functionality_information_id | u(8) |
|   subpic_flag | u(1) |
|   if( subpic_flag ) { | |
|     num_subpics_minus1 | ue(v) |
|     subpic_id_len_minus1 | ue(v) |
|     for( i = 0; i <= num_subpics_minus1; i++ ) | |
|       subpic_id[ i ] | u(v) |
|   } | |
|   ... | |
| } | | subpic_flag equal to 1 specifies that the referencing SEI message apply only to specific subpictures of the picture for which the SEI message is associated. subpic_flag equal to 0 specifies that the referencing SEI message apply to all subpictures of the picture.

num_subpics_minus1 plus 1 specifies the number of subpictures in the picture.

subpic_id_len_minus1 plus 1 specifies the number of bits used to represent the syntax element subpic_id[i]. The value of subpic_id_len_minus1 shall be in the range of 0 to 15, inclusive.

subpic_id[i] indicates the subpicture ID of the i-th subpicture in the picture. The length of the subpic_id[i] syntax element is subpic_id_len_minus1+1 bits.

In another version of the embodiment the pictures for which the functionality information is applied is listed in the referencing SEI message, for example as absolute POC values or delta POC value.

Persistence Scope of the Functionality Information SEI Message

In yet another version of the embodiment the functionality information SEI message may be specified to be active or not, e.g. specified with a syntax element (e.g. an indicator such as a flag) in the functionality information SEI message. By the functionality information SEI being active we mean that the functionality information may be applied to a segment without the first packet (the functionality information SEI message) being referenced by the second packet (the referencing SEI message). Thus, the indicator value indicates whether the functionality information may be applied to the segment without the first packet being referenced by the second packet. This is illustrated with the sei_active_flag syntax element in the example syntax table below.

If the sei_active_flag has a certain value, e.g. 1, the functionality information SEI is specified to be active by its own with its own persistence scope defined. For instance, the persistence scope for the functionality information SEI message may be defined to have a certain persistence, such as the remainder of the CVLS, unless it is referenced by a referencing SEI message with referenced_functionality_information_id equal to functionality_information_id of the functionality information SEI, in which case the persistence scope of the referencing SEI supersedes the original persistence scope of the functionality information SEI message. If the sei_active_flag has another value, e.g. 0, the functionality information SEI is specified to not be active unless it is referenced by a referencing SEI message, in which case it becomes active and the persistence scope of the referencing SEI message applies to the functionality information SEI message.

| | Descriptor |
|---|---|
| functionality_information_sei ( payloadSize ) { | |
|   functionality_information_id | u(8) |
|   sei_active_flag | u(1) |
|   ... | |
|   functionality_information( ) | |
| } | |

Option to Disallow Referencing SEI Messages

Since there is an extra burden to signal many small SEI messages when not needed, the functionality information SEI message may contain an indicator value whether the referencing SEI messages can be expected in the bitstream or not. When the indicator has a first value, e.g. 1, referencing is allowed, and the functionality information SEI is specified to be inactive by its own. When the indicator has a second value, e.g. 0, referencing is not allowed and the functionality information SEI message is active and acts as a conventional SEI message. Referencing SEI messages referencing the functionality information SEI message may then not be present in the bitstream following the functionality information SEI message. One possible exception is if another functionality information SEI, with the first value for the indicator, follows the first functionality information SEI message in the bitstream, which then overwrites the first functionality information SEI message. When referencing SEI messages are not allowed, there is no need for sending an identifier in the functionality information SEI message. This is illustrated in the example syntax below where the referencing_allowed_flag comprises the indicator value.

|  | Descriptor |
|---|---|
| functionality_information_sei ( payloadSize ) { | |
|   referencing_allowed_flag | u(1) |
|   if (referencing_allowed_flag) | |
|     functionality_information_id | u(8) |
|   ... | |
|   functionality_information( ) | |
| } | |

Combining the Functionality Information SEI Message and the Referencing SEI Message In another version of this embodiment the functionality information SEI message and the referencing SEI message are specified in the same type of SEI message with the same SEI payload type value. When the SEI message is acting as a referencing SEI message it does not include any syntax elements for the functionality information except the reference to an instance of the SEI message acting as a functionality SEI message, and possibly one or a few syntax elements for light-weight control of the functionality. The syntax table below exemplifies specifying the functionality information SEI message and the referencing SEI message in the same type of SEI message. In the example, the referencing_flag is used to specify if the SEI message acts as functionality information SEI message or a referencing SEI message.

|  | Descriptor |
|---|---|
| functionality_information_and_referencing_sei ( payloadSize ) { | |
|   referencing_flag | u(1) |
|   if (referencing_flag) { | |
|     referenced_functionality_information_id | u(8) |
|     ... | |
|   } else { | |
|     functionality_information_id | u(8) |
|     ... | |
|     functionality_information( ) | |
|   } | |
| } | |

The main advantage of having the functionality information SEI message and the referencing SEI message specified in the same type of SEI message is that it saves one SEI payload type value and that it may increase readability of the specification.

Order in Bitstream

In some embodiments, a referencing SEI message follows its referenced functionality information SEI message in decoding order in the bitstream. In another embodiment, a referencing SEI message may precede its referenced functionality information SEI message in decoding order. In that case, the reference indicator may be parsed, but the process of applying the functionality SEI message on the one or more segments may not start until the functionality information SEI message has been received. In yet another embodiment the functionality SEI message and the referencing SEI message is provided by external means.

Comparing Solution to Parameter Sets

As mentioned previously, the referencing SEI message may typically be sent more frequently than the functionality information SEI message, e.g. for each picture or even subpicture or slice. For instance, if the functionality information SEI message is sent once per CVLS, it may be referenced by the referencing SEI message similar to how an SPS is referenced in VVC. If the functionality information SEI message is sent more often, such as for a set of pictures or even a single picture, it may be referenced by a referencing SEI message every picture similar to how a PPS or an APS are referenced in VVC. If the functionality information SEI message is sent for a set of pictures or a single picture, it may be also referenced by a referencing SEI message for each slice similar to how an APS are referenced in VVC.

One benefit of referencing a specific SEI message as in this embodiment compared to referencing a parameter set is that new functionality can be added later to an already finalized specification. For example for VVC version 1, there will be no further normative additions such as added signaling in the parameter sets, whereas a VVC version 1 decoder may support SEI messages that were added to the VVC specification after the VVC version 1 specification was finalized.

Encoder and Decoder Steps

An encoder may apply all or a subset of the following steps for encoding a segment to a bitstream according to this embodiment:
(1) Determine an identifier value for a first packet of a first packet type, the identifier value representing an identifier of the first packet. A packet here may be an NAL unit. The first packet in some embodiments is a non-VCL NAL unit, and the first packet type may be an SEI message. The first packet type may also be of another non-VCL NAL unit type like a parameter set such as SPS, PPS or APS.
(2) Encode the identifier value to one or more syntax elements in a first set of syntax elements in the first packet and encode the first packet to a bitstream.
(3) Determine a functionality to be applied to the segment. The functionality may be specified by functionality information. The functionality information may, for instance, be syntax elements specifying any type of functionality that can be carried in an SEI message, such as film grain parameters, LMCS parameters, mastering display color volume parameters, content light level parameters, ambient viewing environment parameters, content color volume parameters, sphere rotation parameters, region-wise packing parameters, omni-directional viewport parameters, sample aspect ratio parameters, annotated regions parameters, scalability dimension parameters, multiview acquisition parameters, and depth representation parameters. These parameters may include model descriptions, filter strengths, and so on. Functionality information can alternatively in this disclosure be interpreted as parameter values or syntax element values.
(4) Encode the functionality information to one or more syntax elements of a set of syntax elements. The set of syntax elements may be a subset of the first set of syntax elements encoded to the first packet.

(5) Encode a reference ID value corresponding to the identifier value (for instance the reference ID value may be equal to the identifier value) to one or more syntax elements in a second packet of a second packet type. The second packet type may be an SEI message. If both of the first packet type and the second packet type are SEI messages, the payload type of the first SEI message may or may not be the same as the payload type of the second SEI message.

(6) Encode the segment to a third packet in the bitstream. A packet here may be a VCL NAL unit and the packet type may be a slice type. A segment may, for instance, be a picture, a subpicture, a slice, a tile, or a CTU. The second packet is associated with the segment such that the functionality information is to be applied to the segment. For example, the second packet may be the closest preceding packet of the second packet type, wherein the closest preceding packet of the second packet type is the packet having a second packet type that precedes the third packet in decoding order and there is no other packet having a second packet type that follows the closest preceding packet and precedes the third packet in decoding order. In some embodiments, the closest preceding packet is the one included in the same AU as the third packet.

A decoder may perform all or a subset of the following steps for decoding a segment from a bitstream according to this embodiment:

(1) Receive a first packet of a first packet type in a bitstream, where the first packet comprises a first set of syntax elements. A packet may be a NAL unit. The first packet in some embodiments may be a non-VCL NAL unit, and the first packet type may be an SEI message. The first packet type may also be of another non-VCL NAL unit type like a parameter set such as SPS, PPS or APS.

(2) Decode an identifier value from one or more syntax elements in the first set of syntax elements of the first packet, the identifier value representing a unique identifier of the first packet.

(3) Decode functionality information from a set of syntax elements in the bitstream, wherein the functionality information specifies a functionality. The set of syntax elements may be a subset of the first set of syntax elements of the first packet. The functionality information may, for instance, be syntax elements specifying any type of functionality that can be carried in an SEI message, such as film grain parameters, LMCS parameters, mastering display color volume parameters, content light level parameters, ambient viewing environment parameters, content color volume parameters, sphere rotation parameters, region-wise packing parameters, omni-directional viewport parameters, sample aspect ratio parameters, annotated regions parameters, scalability dimension parameters, multiview acquisition parameters, and depth representation parameters. These parameters may include model descriptions such as filter model type, filter strengths, and so on. Functionality information can alternatively in this disclosure be interpreted as parameter values or syntax element values.

(4) Receive a second packet of a second packet type from the bitstream, comprising a second set of syntax elements. The second packet type may be an SEI message. If both of the first packet type and the second packet type are SEI messages, the payload type of the first SEI message may or may not be the same as the payload type of the second SEI message.

(5) Decode a reference ID value from one or more syntax element in the second set of syntax elements of the second packet.

(6) Receive a third packet of a third packet type in the bitstream comprising a third set of syntax elements. The third packet may be a VCL NAL unit and the third packet type may be a slice type.

(7) Determine that the second packet is associated with the segment such that the functionality information is to be applied to the segment. For example, the second packet may be the closest preceding packet of the second packet type. The closest preceding packet of the second packet type may be defined as the packet having a second packet type that precedes the third packet in decoding order and there is no other packet having a second packet type that follows the closest preceding packet and precedes the third packet in decoding order. In some embodiments, the closest preceding packet is the one included in the same AU as the third packet.

(8) Optionally, for the case when the set of syntax elements are a subset of the first set of syntax elements of the first packet, determine that the reference ID value corresponds to (e.g., is equal to) the identifier value and in response to determining that the reference ID value corresponds to the identifier value, select the functionality information from the first set of syntax elements.

(9) Decode the segment from the third set of syntax elements and apply the functionality to the segment based on the selected functionality information. The decoding of the segment may or may not use the selected functionality information. A segment may, for instance, be a picture, a subpicture, a slice, a tile, or a CTU. Alternatively, the functionality information may be used in the decoding, such that the segment is decoded from the third set of syntax elements and from the selected functionality information.

Embodiment 2—Film Grain SEI Message Using a Second SEI Message with Reference and Seed It may be advantageous to apply different sets of film grain model parameters to different parts of a video. To accomplish that in the current film grain SEI message in the VSEI specification one would have to send the full film grain SEI message every time the set of film grain model parameters would be changed even if the set of film grain model parameters has been used previously in the bitstream. That is wasteful since the film grain SEI message comprises a lot of bits.

In a second embodiment based on the first embodiment the functionality information SEI message is a film grain SEI message used to apply film grain to a decoded video in a post-processing step following the decoding. An example of a film grain SEI message syntax is shown below.

| | Descriptor |
|---|---|
| film_grain_sei ( payloadSize ) {  film_grain_sei_id  ...  film_grain_model_syntax_elements( ) } | u(8) |

The film grain SEI message includes a film grain_sei_id that uniquely identifies an instance of the film grain SEI message in the bitstream, and a set of syntax elements, film_grain_model_syntax_elements( ) for specifying the film grain model.

The embodiment also includes a film grain referencing SEI message based on the referencing SEI message from the first embodiment. An example syntax of the film grain referencing SEI message is shown below.

|  | Descriptor |
|---|---|
| film_grain_referencing_sei ( payloadSize ) { | |
|   referenced_film_grain_sei_id | u(8) |
|   film_grain_seed | u(8) |
|   ... | |
|   } | |
| } | |

The film grain referencing SEI has a referenced_film_grain_sei_id syntax element that is used to reference a specific instance of the film grain SEI message with a film_grain_sei_id value corresponding to the value of referenced_film_grain_sei_id. The film grain referencing SEI message may also comprise a syntax element film_grain_seed used to determine a seed value that is used as a starting value for generating film grain using the film grain model parameters in the film grain SEI message. The film grain referencing SEI message could also comprise syntax elements from the film grain SEI message which one may want to have frequently modified, such as the scale factor or blending mode.

Embodiment 3—LMCS Out-of-Loop SEI Message Using a Second SEI Message with Reference In a third embodiment based on the first embodiment the functionality information SEI message is an LMCS out-of-loop SEI message that specifies the LMCS model to be used out of loop. The referencing SEI message references the LMCS out-of-loop SEI message to identify the LMCS model to be applied to the one or more segments. Example syntax for the two SEI messages are shown below.

|  | Descriptor |
|---|---|
| lmcs_out_of_loop_sei ( payloadSize ) { | |
|   lmcs_out_of_loop_sei_id | u(8) |
|   ... | |
|   lmcs_out_of_loop_model_syntax_elements( ) | |
| } | |

|  | Descriptor |
|---|---|
| lmcs_out_of_loop_referencing_sei ( payloadSize ) { | |
|   referenced_lmcs_out_of_loop_sei_id | u(8) |
|   ... | |
|   } | |
| } | |

In another version of the embodiment based on the first embodiment the first packet is a parameter set, such as an SPS, a PPS or an APS and the second packet is a referencing SEI message. The parameter set comprises syntax elements that specifies the LMCS model to be applied to the one or more segments. In an embodiment the parameter set is an APS. The referencing SEI message comprises a syntax element identifying the parameter set identifier, e.g. APS ID, of the parameter set containing the LMCS model to be applied to the one or more segments. The syntax table below shows an example of the referencing SEI message.

|  | Descriptor |
|---|---|
| lmcs_out_of_loop_referencing_sei ( payloadSize ) { | |
|   referenced_lmcs_out_of_loop_aps_id | u(8) |
|   ... | |
|   } | |
| } | |

Embodiment 4—Generic Wrapper SEI Message

In a fourth embodiment based on the first embodiment the SEI message with the identifier value and the referencing SEI message are both generic SEI messages. As in the first embodiment the SEI message with the identifier is referenced by the generic referencing SEI message. The difference from the first embodiment is that the functionality information of the SEI message with the identifier value is not specified for the first SEI message but instead the first SEI message encloses or references another existing SEI message. In this embodiment we will refer to the enclosed or referenced SEI message as the functionality information SEI message and the SEI message with the identifier as the generic wrapper SEI message since it encloses the functionality information SEI message or references it.

The advantage of this solution is that the referencing functionality of this invention can be applied to any SEI message, even already specified SEI messages without making any changes to those SEI messages.

In a first version of this embodiment the generic wrapper SEI message comprises a generic wrapper identifier value, that uniquely identifies the instance of the generic wrapper SEI message, and the payload of an enclosed functionality information SEI message. The generic referencing SEI message includes a syntax element for identifying the referenced generic wrapper SEI message. The generic referencing SEI message may also contain the SEI payload type of the functionality information SEI message enclosed in the generic wrapper SEI message to easier identify the SEI message that is to be applied to the one or more segments in the scope for the referencing SEI message. This is also useful for error resilience reasons as it can be easier to identify if a an SEI message has been lost or by other means removed from the bitstream. An example of the first version of the embodiment is shown below where sei_message( ) contains the enclosed functionality information SEI message.

|  | Descriptor |
|---|---|
| generic_wrapper_sei ( payloadSize ) { | |
|   generic_wrapper_id | u(8) |
|   ... | |
|   sei_message( ) | |
| } | |

| | Descriptor |
|---|---|
| generic_referencing_sei ( payloadSize ) { | |
|    referenced_generic_wrapper_id | u(8) |
|    functionality_information_sei_payload_type | u(8) |
|    ... | |
| } | |

In another version of the embodiment the generic wrapper SEI message does not enclose the functionality information SEI message but references it as illustrated below by including the payload for it.

| | Descriptor |
|---|---|
| generic_wrapper_sei ( payloadSize ) { | |
|    generic_wrapper_id | u(8) |
|    ... | |
|    functionality_information_sei_payload_type | |
| } | |

In yet another embodiment, the generic wrapper SEI message neither encloses nor directly references the functionality information SEI message to use, but instead the SEI message directly following the generic wrapper SEI message in decoding order in the bitstream is the functionality information SEI message to use. This is illustrated in the bitstream of FIG. 7.

Figure 7:
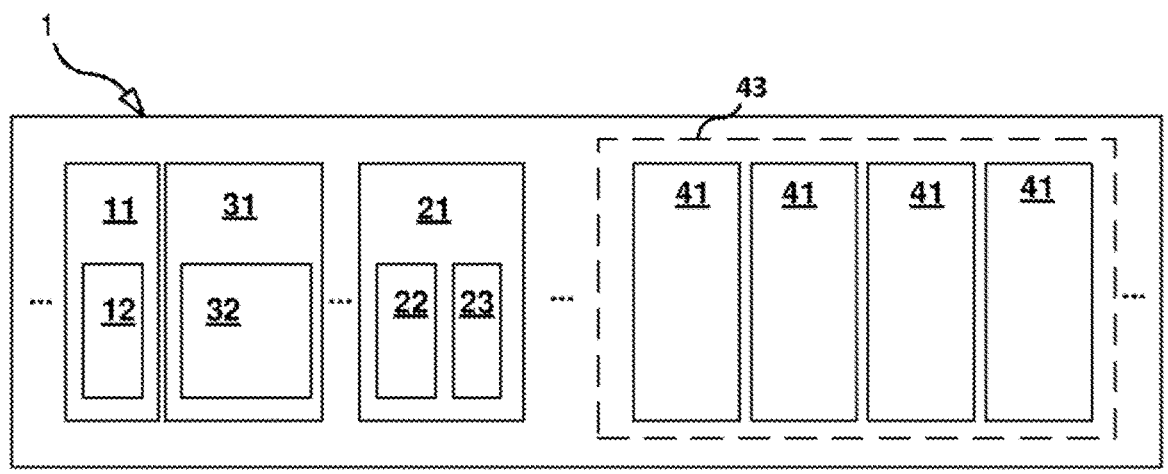
FIG. 7 is an exemplary bitstream according to an embodiment.
Figure 4:
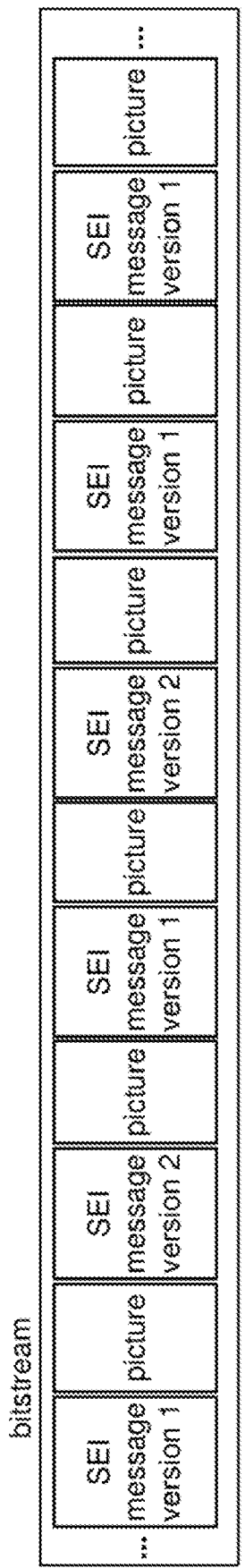
FIG. 4 is an exemplary bitstream according to an embodiment.

FIG. 7 illustrates an exemplary bitstream according to an embodiment. An encoder may encode a bitstream such as that illustrated in FIG. 7, and a decoder may decode a bitstream such as that illustrated in FIG. 7. The bitstream in FIG. 7 is similar to that shown in FIG. 5, except that in FIG. 5 the second packet 11 included both a reference identifier 12 and functionality information 32, while in FIG. 7 the second packet 11 (e.g., a generic wrapper SEI message) includes a reference identifier 12 and is immediately followed by functionality information message 31 (e.g., a functionality information SEI message) that includes functionality information 32.

In other embodiment the generic wrapper encloses or references more than one SEI message. The example syntax below illustrates the generic wrapper SEI message enclosing more than one functionality information SEI message.

| | Descriptor |
|---|---|
| generic_wrapper_sei ( payloadSize ) { | |
|    generic_wrapper_id | u(8) |
|    ... | |
|    num_seis_minus1 | ue(v) |
|    while( !byte_aligned( ) ) | |
|       zero_bit /* equal to 0 */ | u(1) |
|    for( i = 0; i <= num_seis_minus1; i++ ) | |
|       sei_message ( ) | |
| } | |

In another embodiment the generic wrapper SEI message and the generic referencing SEI message are combined in one SEI message type with one value for SEI payload type, similar to how it is described in the first embodiment.

A specification may list which SEI messages that may be used with the generic wrapper SEI message.

A specification may also list which SEI messages that may not be used with the generic wrapper SEI message.

Embodiment 5—Signal Identifier in the SEI Payload Extension

In a fifth embodiment, which is based on the first embodiment, the identifier value of the functionality information SEI message is signaled in an extension of the packet. In one version of the embodiment, the reserved bits in the SEI payload structure, sei_reserved_payload_extension_data, are used to signal the identifier value for the functionality information SEI message. The solution is illustrated in the syntax table below where the syntax element for the identifier value for the functionality information SEI message in the first embodiment is called sei_unique_id.

| | Descriptor |
|---|---|
| sei_payload( payloadType, payloadSize ) { | |
|   if( nal_unit_type = = PREFIX_SEI_NUT ) | |
|     if( payloadType = = 0 ) | |
|       buffering_period( payloadSize ) | |
|     ... | |
|   else /* nal_unit_type = = SUFFIX_SEI_NUT */ | |
|     if( payloadType = = 3 ) /* Specified in Rec. ITU-T H.274 \| ISO/IEC 23002-7 */ | |
|       filler_payload( payloadSize ) | |
|     ... | |
|   if( more_data_in_payload( ) ) { | |
|     if( payload_extension_present( ) ) | |
|       sei_unique_id | u(8) |
|     sei_payload_bit_equal_to_one /* equal to 1 */ | f(1) |
|     while( !byte_aligned( ) ) | |
|       sei_payload_bit_equal_to_zero /* equal to 0 */ | f(1) |
|   } | |
| } | |

This solution is also generic and does not require each SEI message to implement its own identifier. One downside is that the identifier value will be signaled after the actual payload of the SEI message.

Embodiment 6—in a Second SEI Message, Signal Identifier to a First SEI Message and Modifications to the Functionality of the First SEI Message In a sixth embodiment, the identifier value of the functionality information SEI message is signaled in a referencing SEI message together with at least one syntax element in the referencing SEI message that overwrites a former value of at least one syntax element in the functionality information SEI message. The tables below show example syntax for using two different types of SEI messages for the embodiment.

| | Descriptor |
|---|---|
| functionality_information_sei ( payloadSize ) { | |
|    functionality_information_id | u(8) |
|    ... | |
|    functionality_information_syntax_1 | u(8) |
|    ... | u(8) |
|    functionality_information_syntax_N | u(8) |
| } | |
| referencing_sei ( payloadSize ) { | |
|    referenced_functionality_information_id | u(8) |
|    ... | |
|    functionality_information_syntax_I | u(8) |
| } | |

The first SEI message is the SEI message carrying the functionality information. An instance of the SEI message is uniquely identified using the functionality_information_id. The functionality_information_syntax_1 to functionality_information_syntax_N in the syntax table represent the syntax elements used to specify the functionality. Two functionality information SEI messages with different functionality_information_id may have different values for the functionality information syntax elements. The second SEI message is the SEI message referencing the functionality information SEI message using the referenced_functionality_information_id. The referencing SEI message also comprises one or a few syntax elements such as functionality_information_syntax_I (1≤I≤N) overwriting at least one syntax element specified in the functionality information SEI message.

Figure 8:
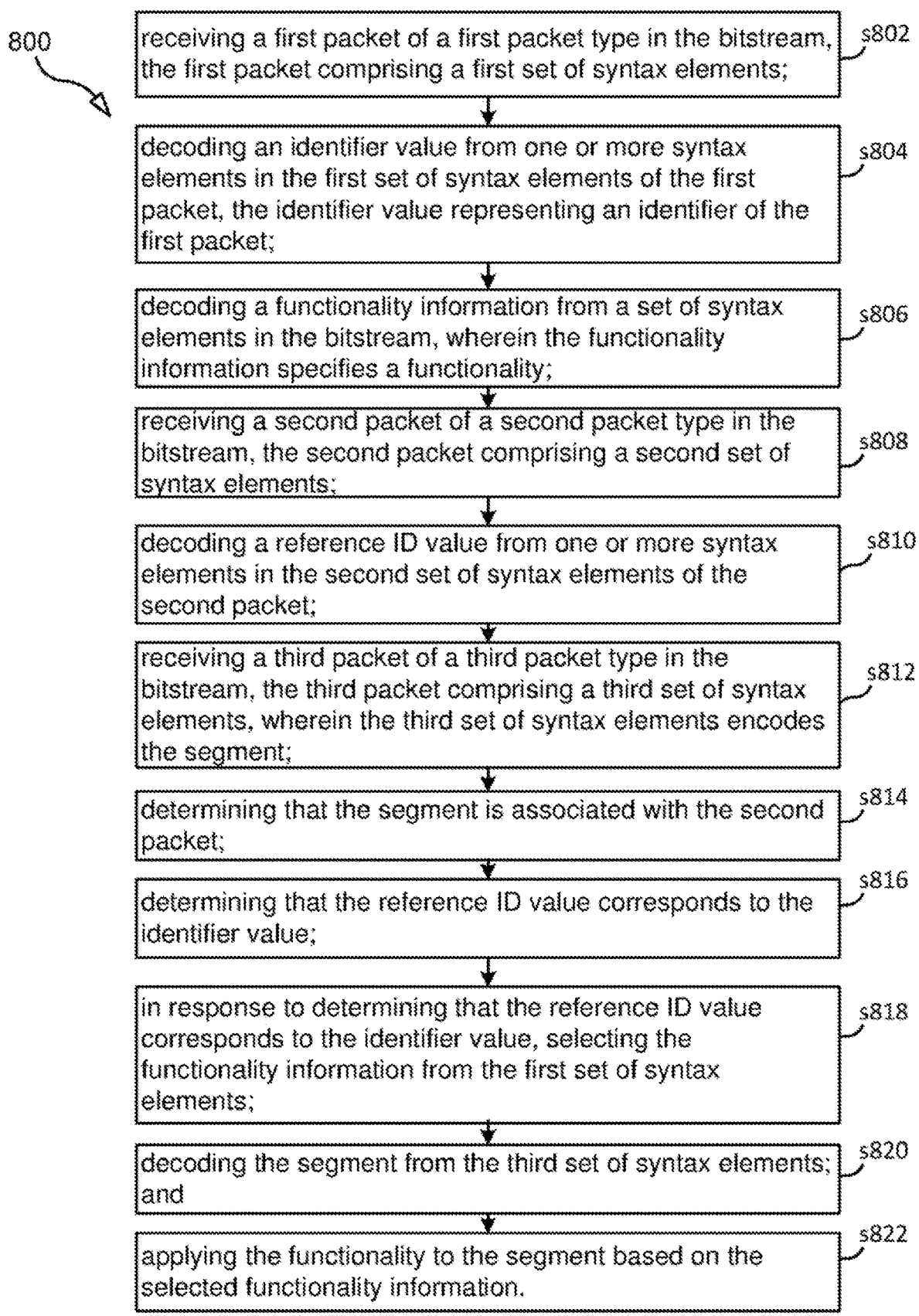
FIG. 8 is a flow chart according to an embodiment.

FIG. 8 illustrates a flow chart according to an embodiment. Process 800 is a method for decoding a segment from a bitstream. The method may begin with step s802.

Step s802 comprises receiving a first packet of a first packet type in the bitstream, the first packet comprising a first set of syntax elements.

Step s804 comprises decoding an identifier value from one or more syntax elements in the first set of syntax elements of the first packet, the identifier value representing an identifier of the first packet.

Step s806 comprises decoding a functionality information from a set of syntax elements in the bitstream, wherein the functionality information specifies a functionality.

Step s808 comprises receiving a second packet of a second packet type in the bitstream, the second packet comprising a second set of syntax elements.

Step s810 comprises decoding a reference ID value from one or more syntax elements in the second set of syntax elements of the second packet.

Step s812 comprises receiving a third packet of a third packet type in the bitstream, the third packet comprising a third set of syntax elements, wherein the third set of syntax elements encodes a segment. Encoding a segment may include completely encoding the segment, or encoding part of a segment. In some embodiments, the third packet comprises a coded representation of at least 95% of the segment.

Step s814 comprises determining that the segment is associated with the second packet.

Step s816 comprises determining that the reference ID value corresponds to the identifier value.

Step s818 comprises, in response to determining that the reference ID value corresponds to the identifier value, selecting the functionality information from the first set of syntax elements.

Step s820 comprises decoding the segment from the third set of syntax elements.

Step s822 comprises applying the functionality to the segment based on the selected functionality information.

In some embodiments, decoding a functionality information from a set of syntax elements in the bitstream comprises decoding functionality information from the first set of syntax elements in the first packet. In some embodiments, each of the first packet, second packet, and third packet respectively comprise a Network Abstraction Layer (NAL) unit. In some embodiments, one or both of the first packet type and the second packet type comprises an SEI message. In some embodiments, the third packet type comprises a slice type. In some embodiments, the first packet is of the same type and subtype (e.g. type of SEI message) as the second packet. Where a given packet type may itself have different types, the different types of the packet type may be referred to as subtypes of the packet type. In one example for the VVC specification, the type is the NAL unit type such as the PREFIX_SEI_NUT nal_unit_type which specifies that the NAL unit is a prefix SEI message. The subtype may here be the payload type of the SEI message carried in the prefix SEI message NAL unit. The payload type is decoded from the payload_type_byte syntax element in the NAL unit and the payloadType variable is assigned to the value of the payload type. One example of a subtype is the buffering period SEI message which is signaled using payload type 0 and setting payloadType equal to 0.

In some embodiments, the first packet is of the same type as the second packet and the first packet is of a different subtype than the second packet. In some embodiments, the segment comprises one or more of a picture, a subpicture, a slice, a tile, and a coding tree unit (CTU). In some embodiments, the method further includes decoding an indicator value from the first set of syntax elements, the indicator value indicating whether both the identifier value and the second set of syntax elements is present in the bitstream. In some embodiments, determining that the segment is associated with the second packet comprises one or more of: (i) determining that the segment is in the same Access Unit (AU) or Picture Unit (PU) as the second packet; (ii) determining that the third packet comprising the segment directly follows the second packet in the bitstream; (iii) determining that the second packet is the closest preceding packet of the second packet type, wherein the closest preceding packet of the second packet type is the packet having a second packet type that precedes the third packet comprising the segment in decoding order and there is no other packet having the second packet type that follows the closest preceding packet and precedes the third packet comprising the segment in decoding order; (iv) determining that the second packet comprises a persistence flag specifying that the second packet is associated to the segment or to the third packet comprising the segment; and (v) decoding a segment identifier value, representing an identifier of the segment, from one or more syntax elements in the bitstream, decoding a reference segment ID value from one or more syntax elements in the second packet, and determining that the segment identifier value corresponds to the reference segment ID value.

In some embodiments, the method further includes decoding an indicator value from the first set of syntax elements, the indicator value indicating whether the functionality information may be applied to the segment without the first packet being referenced by the second packet. In some embodiments, the first packet precedes the second packet in decoding order in the bitstream. In some embodiments, the functionality information comprises one or more of film grain parameters, luma mapping with chroma scaling (LMCS) parameters, mastering display color volume parameters, content light level parameters, ambient viewing environment parameters, content color volume parameters, sphere rotation parameters, region-wise packing parameters, omni-directional viewport parameters, sample aspect ratio parameters, annotated regions parameters, scalability dimension parameters, multiview acquisition parameters, depth representation parameters, a filter model type, a filter strength, and a model description. In some embodiments, the functionality information comprises information specifying a film grain model, the method further comprising: decoding a seed value from one or more syntax elements in the second set of syntax elements; and using the seed value when applying film grain with the film grain model to the segment associated with the second packet.

In some embodiments, the method further includes receiving a fourth packet of a fourth packet type in the bitstream, wherein the fourth packet comprises a fourth set of syntax elements, and the fourth packet precedes the second packet in decoding order, and wherein decoding a functionality information from a set of syntax elements in the bitstream comprises decoding functionality information from the fourth set of syntax elements in the fourth packet. In some embodiments, the fourth packet follows the first packet in decoding order. In some embodiments, the fourth packet is contained in the first packet. In some embodiments, the fourth packet type is an SEI message. In some embodiments, the method further includes decoding an SEI payload type value from a syntax element in the first packet, the SEI payload type value indicating the SEI payload type value of the fourth packet. In some embodiments, the identifier value is decoded from an extension in the first packet. In some embodiments, at least one syntax element of the fourth set of syntax elements overwrites the functionality information from one or more syntax elements of a fourth set of syntax elements.

Figure 9:
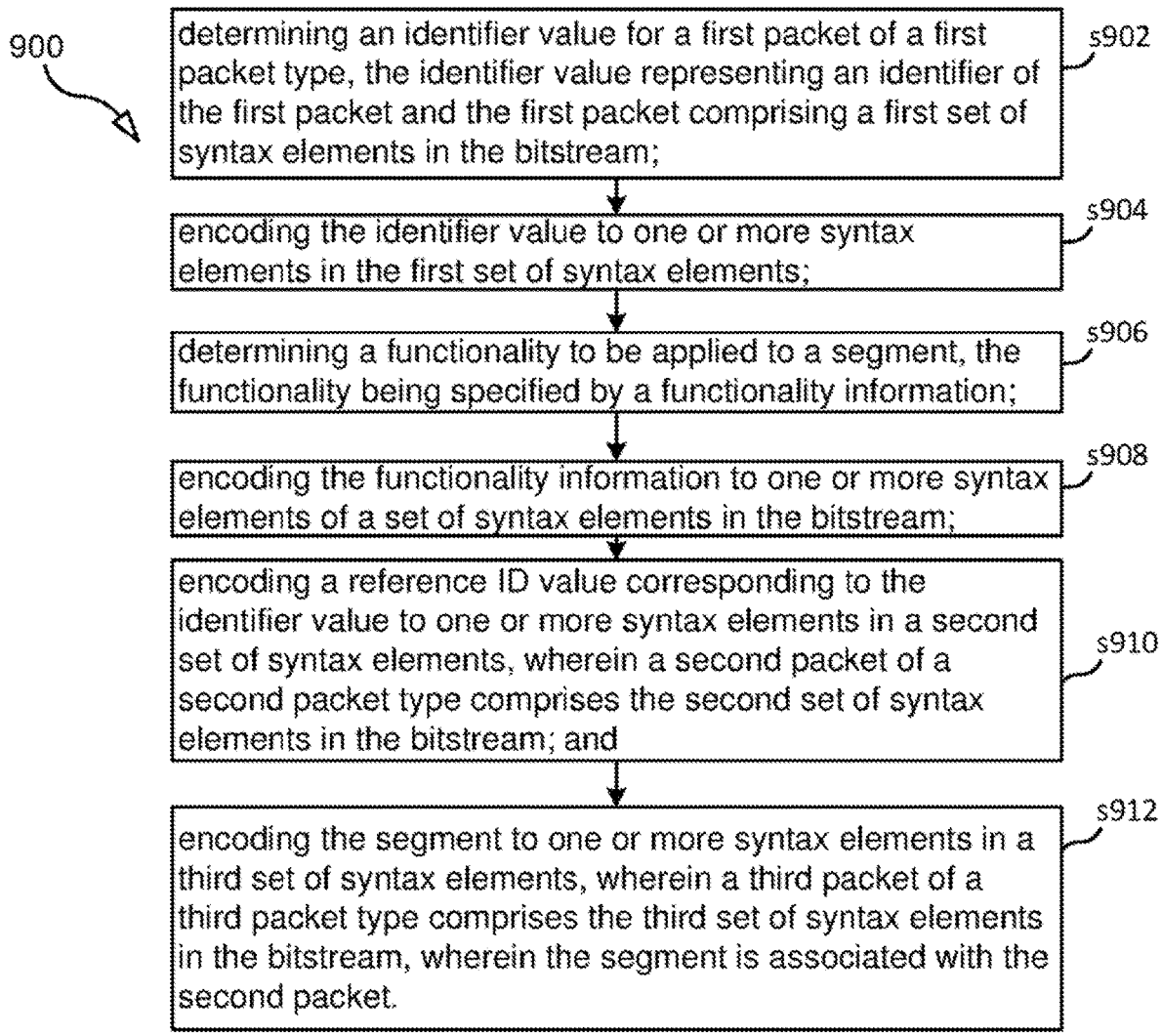
FIG. 9 is a flow chart according to an embodiment.

FIG. 9 illustrates a flow chart according to an embodiment. Process 900 is a method for encoding a segment to a bitstream. The method may begin with step s902.

Step s902 comprises determining an identifier value for a first packet of a first packet type, the identifier value representing an identifier of the first packet and the first packet comprising a first set of syntax elements in the bitstream.

Step s904 comprises encoding the identifier value to one or more syntax elements in the first set of syntax elements.

Step s906 comprises determining a functionality to be applied to a segment, the functionality being specified by functionality information.

Step s908 comprises encoding the functionality information to one or more syntax elements of a set of syntax elements in the bitstream.

Step s910 comprises encoding a reference ID value corresponding to the identifier value to one or more syntax elements in a second set of syntax elements, wherein a second packet of a second packet type comprises the second set of syntax elements in the bitstream.

Step s912 comprises encoding the segment to one or more syntax elements in a third set of syntax elements, wherein a third packet of a third packet type comprises the third set of syntax elements in the bitstream, wherein the segment is associated with the second packet.

In some embodiments, encoding the functionality information to one or more syntax elements of a set of syntax elements in the bitstream comprises encoding functionality information to the first set of syntax elements in the first packet. In some embodiments, each of the first packet, second packet, and third packet respectively comprise a Network Abstraction Layer (NAL) unit. In some embodiments, one or both of the first packet type and the second packet type comprises an SEI message. In some embodiments, the third packet type comprises a slice type. In some embodiments, the first packet is of the same type and subtype (e.g. type of SEI message) as the second packet. In some embodiments, the first packet is of the same type as the second packet and the first packet is of a different subtype than the second packet. In some embodiments, the segment comprises one or more of a picture, a subpicture, a slice, a tile, and a coding tree unit (CTU).

In some embodiments, the method further includes encoding an indicator value to the first set of syntax elements, the indicator value indicating whether both the identifier value and the second set of syntax elements is present in the bitstream. In some embodiments, the segment is associated with the second packet in at least one of the following ways: (i) the segment is in the same Access Unit (AU) or Picture Unit (PU) as the second packet; (ii) the third packet comprising the segment directly follows the second packet in the bitstream; (iii) the second packet is the closest preceding packet of the second packet type, wherein the closest preceding packet of the second packet type is the packet having a second packet type that precedes the third packet comprising the segment in decoding order and there is no other packet having the second packet type that follows the closest preceding packet and precedes the third packet comprising the segment in decoding order; (iv) the second packet comprises a persistence flag specifying that the second packet is associated to the segment or to the third packet comprising the segment; and (v) a segment identifier value corresponds to a reference segment ID value.

In some embodiments, the method further includes encoding an indicator value to the first set of syntax elements, the indicator value indicating whether the functionality information may be applied to the segment without the first packet being referenced by the second packet. In some embodiments, the first packet precedes the second packet in decoding order in the bitstream. In some embodiments, the functionality information comprises one or more of film grain parameters, luma mapping with chroma scaling (LMCS) parameters, mastering display color volume parameters, content light level parameters, ambient viewing environment parameters, content color volume parameters, sphere rotation parameters, region-wise packing parameters, omni-directional viewport parameters, sample aspect ratio parameters, annotated regions parameters, scalability dimension parameters, multiview acquisition parameters, depth representation parameters, a filter model type, a filter strength, and a model description. In some embodiments, the functionality information comprises information specifying a film grain model, and the method further comprises encoding a seed value to one or more syntax elements in the second set of syntax elements.

In some embodiments, the method further includes encoding a fourth packet of a fourth packet type in the bitstream, wherein the fourth packet comprises a fourth set of syntax elements, and the fourth packet precedes the second packet in decoding order, and wherein encoding functionality information to a set of syntax elements in the bitstream comprises encoding functionality information to the fourth set of syntax elements in the fourth packet. In some embodiments, the fourth packet follows the first packet in decoding order. In some embodiments, the fourth packet is contained in the first packet. In some embodiments, the fourth packet type is an SEI message. In some embodiments, the method further includes encoding an SEI payload type value to a syntax element in the first packet, the SEI payload type value indicating the SEI payload type value of the fourth packet. In some embodiments, the identifier value is encoded to an extension in the first packet. In some embodiments, at least one syntax element of the fourth set of syntax elements overwrites the functionality information from one or more syntax elements of a fourth set of syntax elements.

Figure 10:
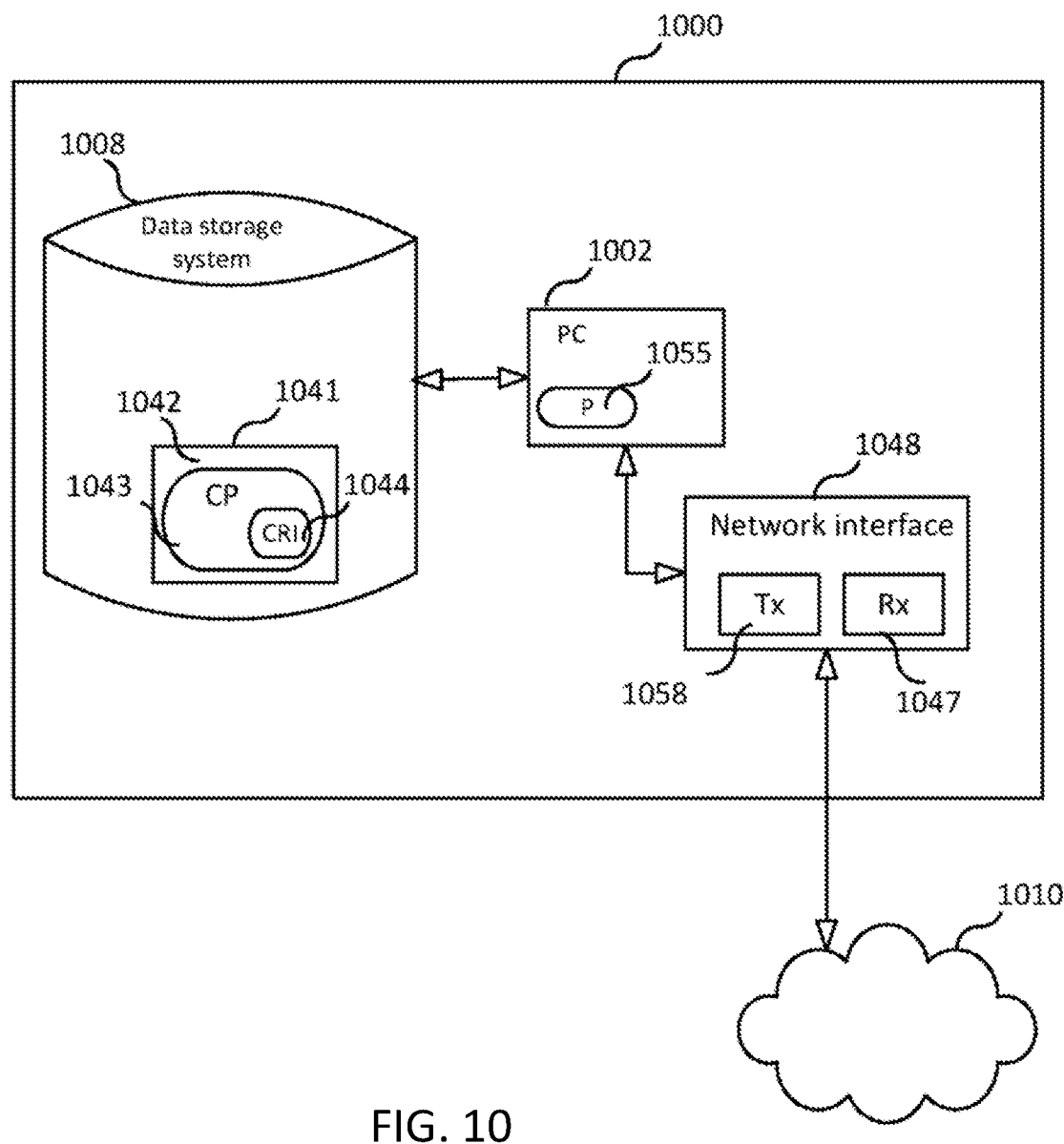
FIG. 10 is a block diagram of an encoder according to an embodiment.

FIG. 10 is a block diagram of node 1000 (e.g., an encoder or decoder), according to some embodiments. As shown in FIG. 10, node 1000 may comprise: processing circuitry (PC) 1002, which may include one or more processors (P) 1055 (e.g., one or more general purpose microprocessors and/or one or more other processors, such as an application specific integrated circuit (ASIC), field-programmable gate arrays (FPGAs), and the like), which processors may be co-located in a single housing or in a single data center or may be geographically distributed (i.e., node 1000 may be a distributed computing apparatus); at least one network interface 1048 (e.g., a physical interface or air interface) comprising a transmitter (Tx) 1045 and a receiver (Rx) 1047 for enabling node 1000 to transmit data to and receive data from other nodes connected to a network 1010 (e.g., an Internet Protocol (IP) network) to which network interface 1048 is connected (physically or wirelessly) (e.g., network interface 1048 may be coupled to an antenna arrangement comprising one or more antennas for enabling node 1000 to wirelessly transmit/receive data); and a local storage unit (a.k.a., "data storage system") 1008, which may include one or more non-volatile storage devices and/or one or more volatile storage devices. In embodiments where PC 1002 includes a programmable processor, a computer program product (CPP) 1041 may be provided. CPP 1041 includes a computer readable medium (CRM) 1042 storing a computer program (CP) 1043 comprising computer readable instructions (CRI) 744. CRM 1042 may be a non-transitory computer readable medium, such as, magnetic media (e.g., a hard disk), optical media, memory devices (e.g., random access memory, flash memory), and the like. In some embodiments, the CRI 1044 of computer program 1043 is configured such that when executed by PC 1002, the CRI causes node 1000 to perform steps described herein (e.g., steps described herein with reference to the flow charts). In other embodiments, node 1000 may be configured to perform steps described herein without the need for code. That is, for example, PC 1002 may consist merely of one or more ASICs. Hence, the features of the embodiments described herein may be implemented in hardware and/or software.

As used herein, a network element, node, or subsystem (e.g., an encoder or decoder) may be comprised of one or more pieces of service network equipment, including hardware and software that communicatively interconnects other equipment on a network (e.g., other network elements, end stations, etc.), and is adapted to host one or more applications or services, either in a virtualized/non-virtualized environment, with respect to a plurality of subscribers and associated user equipment (UE) nodes that are operative to receive/consume content in a media distribution network where media content assets may be distributed and delivered using stream-based or file-based mechanisms. As such, some network elements may be disposed in a wireless radio network environment whereas other network elements may be disposed in a public packet-switched network infrastructure, including or otherwise involving suitable content delivery network (CDN) infrastructure that may comprise public, private, or mixed CDNs. Further, suitable network elements including one or more embodiments set forth herein may involve terrestrial and/or satellite broadband delivery infrastructures, e.g., a Digital Subscriber Line (DSL) network architecture, a Data Over Cable Service Interface Specification (DOCSIS)-compliant Cable Modem Termination System (CMTS) architecture, switched digital video (SDV) network architecture, a Hybrid Fiber-Coaxial (HFC) network architecture, a suitable satellite access network architecture or a broadband wireless access network architecture over cellular and/or WiFi connectivity. Accordingly, some network elements may comprise "multiple services network elements" that provide support for multiple network-based functions (e.g., 360° immersive A/V media preparation delivery policy management, session control, QoS policy enforcement, bandwidth scheduling management, content provider priority policy management, streaming policy management, and the like), in addition to providing support for multiple application services (e.g., data and multimedia applications including 360° immersive video assets (also referred to as 360-degree video assets or simply 360 video assets) in varying qualities or definitions). Example subscriber end stations or client devices may comprise various devices, tethered or untethered, that may consume or deliver media content assets using streaming and/or file-based downloading technologies, which may involve some type of rate adaptation in certain embodiments. Illustrative client devices or UE devices may therefore include any device configured to execute, inter alia, one or more client applications for receiving, recording, storing, and/or decoding/rendering 360 video content, live media and/or static/on-demand media, which may comprise Virtual Reality (VR) media, Augmented Reality (AR) media, Mixed Reality (MR) media, from one or more content providers, e.g., via a broadband access network, using HTTP, HTTPS, RTP, and the like. Accordingly, such client devices may include Next Generation IP-based STBs, networked TVs, personal/digital video recorders (PVR/DVRs), networked media projectors, portable laptops, netbooks, palm tops, tablets, smartphones, multimedia/video phones, mobile/wireless user equipment, portable media players, portable gaming systems or consoles (such as the Wii®, Play Station 3®, etc.) operating in concert with 3D display devices and the like, which may access or consume 360-degree content/services provided via a suitable media distribution network wherein a bandwidth and Quality of Experience (QoE) scheme may be provided in accordance with to one or more embodiments set forth herein.

One or more embodiments of the present patent disclosure may be implemented using different combinations of software, firmware, and/or hardware. Thus, one or more of the techniques shown in the Figures (e.g., flowcharts) may be implemented using code and data stored and executed on one or more electronic devices or nodes (e.g., a subscriber client device or end station, a network element, etc.). Such electronic devices may store and communicate (internally and/or with other electronic devices over a network) code and data using computer-readable media, such as non-transitory computer-readable storage media (e.g., magnetic disks, optical disks, random access memory, read-only memory, flash memory devices, phase-change memory, etc.), transitory computer-readable transmission media (e.g., electrical, optical, acoustical or other form of propagated signals—such as carrier waves, infrared signals, digital signals), etc. In addition, such network elements may typically include a set of one or more processors coupled to one or more other components, such as one or more storage devices (e.g., non-transitory machine-readable storage media) as well as storage database(s), user input/output devices (e.g., a keyboard, a touch screen, a pointing device, and/or a display), and network connections for effectuating signaling and/or bearer media transmission. The coupling of the set of processors and other components may be typically through one or more buses and bridges (also termed as bus controllers), arranged in any known (e.g., symmetric/shared multiprocessing) or heretofore unknown architectures. Thus, the storage device or component of a given electronic device or network element may be configured to store code and/or data for execution on one or more processors of that element, node or electronic device for purposes of implementing one or more techniques of the present disclosure.

Skilled artisans will recognize that the foregoing generalized example network environment may be implemented in a hierarchical network architecture, with various aspects of media capture and preparation, including, e.g., source stream stitching, projection mapping, source media compression, tiled/ABR encoding/transcoding, packaging, etc., as well as distributing/uploading and edge node processes taking place in different network portions disposed at different hierarchical levels, involving one or more operators, content delivery networks (CDNs), edge networks, and the like. Further, in some implementations, at least some of the foregoing apparatuses and processes may be cloud-based. In some arrangements, a CDN can be a large distributed system of servers deployed in multiple data centers connected to the Internet or other public/private communications network. A CDN can be a managed or unmanaged network, and can also be a federation of managed or unmanaged networks.

An example embodiment of a media server/source system operatively associated within the foregoing example network environment may therefore be configured, e.g., as a global headend, to accept media content from live sources and/or static file sources, e.g., online content providers such as Hulu®, Netflix®, YouTube®, or Amazon® Prime, as well as VOD catalog or content providers or studios such as, e.g., Disney, Warner, Sony, etc. Media content from live sources may comprise live programming captured relative to any type of event, e.g., sporting/entertainment/gaming events, concerts, live TV shows, live news broadcasting sources, such as, for instance, national broadcasters (e.g., NBC, ABC, etc.) as well as cable broadcaster channels like Time Warner channels of CNN, ESPN, CNBC, etc., and local broadcasters, etc., including any secondary media insertions such as advertisement media channels.

Abbreviations

| Abbreviation | Explanation |
| --- | --- |
| APS | Adaptation Parameter Set |
| AU | Access Unit |
| AUD | Access Unit Delimiter |
| ALF | Adaptive Loop Filter |
| BLA | Broken Link Access |
| CRA | Clean Random Access |
| CVS | Coded Video Sequence |
| CLVS | Coded Layer Video Sequence |
| CLVSS | Coded Layer Video Sequence Start |
| CTU | Coding Tree Unit |
| CU | Coding Unit |
| DCI | Decoding Capability Information |
| DPB | Decoded Picture Buffer |
| GDR | Gradual Decoding Refresh |
| HEVC | High Efficiency Video Coding |
| IRAP | Intra Random Access Point |
| IDR | Instantaneous Decoding Refresh |
| LMCS | Luma Mapping and Chroma Scaling |
| NAL | Network Abstraction Layer |
| OLS | Output Layer Set |
| POC | Picture Order Count |
| PPS | Picture Parameter Set |
| PU | Picture Unit |
| RADL | Random Access Decodable Leading |
| RASL | Random Access Skipped Leading |
| RPR | Reference Picture Resampling |
| SEI | Supplemental Enhancement Information |
| SPS | Sequence Parameter Set |
| VCL | Video Coding Layer |
| VPS | Video Parameter Set |
| VVC | Versatile Video Coding |

While various embodiments are described herein (and in any appendix), it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for decoding a segment from a bitstream, the method comprising:
receiving a first packet of a first packet type in the bitstream, the first packet comprising a first set of syntax elements;
decoding an identifier value from one or more syntax elements in the first set of syntax elements of the first packet, the identifier value representing an identifier of the first packet;
decoding a functionality information from a set of syntax elements in the bitstream, wherein the functionality information specifies a functionality;
receiving a second packet of a second packet type in the bitstream, the second packet comprising a second set of syntax elements;
decoding a reference identifier (ID) value from one or more syntax elements in the second set of syntax elements of the second packet;
receiving a third packet of a third packet type in the bitstream, the third packet comprising a third set of syntax elements, wherein the third set of syntax elements encodes the segment;
determining that the segment is associated with the second packet;
determining that the reference ID value corresponds to the identifier value;
in response to determining that the reference ID value corresponds to the identifier value, selecting the functionality information from the first set of syntax elements;
decoding the segment from the third set of syntax elements; and
applying the functionality to the segment based on the selected functionality information.

2. The method of claim 1, wherein decoding a functionality information from a set of syntax elements in the bitstream comprises decoding the functionality information from the first set of syntax elements in the first packet.

3. The method of claim 1, further comprising receiving a fourth packet of a fourth packet type in the bitstream, wherein the fourth packet comprises a fourth set of syntax elements, and the fourth packet precedes the second packet in decoding order, and wherein decoding a functionality information from a set of syntax elements in the bitstream comprises decoding the functionality information from the fourth set of syntax elements in the fourth packet.

4. The method of claim 1, wherein the first packet type, the second packet type, and/or the fourth packet type comprises an SEI message.

5. The method of claim 1, wherein the first packet is of the same type as the second packet and the first packet is of a different subtype than the second packet.

6. The method of claim 1, wherein the segment comprises a picture, a subpicture, a slice, a tile, and/or a coding tree unit (CTU).

7. The method of claim 1, further comprising decoding an indicator value from the first set of syntax elements, the indicator value indicating whether both the identifier value and the second set of syntax elements are present in the bitstream.

8. The method of claim 1, wherein determining that the segment is associated with the second packet comprises:
(i) determining that the segment is in the same Access Unit, AU, or Picture Unit, PU, as the second packet;
(ii) determining that the third packet directly follows the second packet in the bitstream;
(iii) determining that the second packet is the closest preceding packet of the second packet type, wherein the closest preceding packet of the second packet type is the packet having a second packet type that precedes the third packet in decoding order and there is no other packet having the second packet type that follows the closest preceding packet and precedes the third packet in decoding order;
(iv) determining that the second packet comprises a persistence flag specifying that the second packet is associated to the segment or to the third packet; and/or
(v) decoding a segment identifier value, representing an identifier of the segment, from one or more syntax elements in the bitstream, decoding a reference segment ID value from one or more syntax elements in the second packet, and determining that the segment identifier value corresponds to the reference segment ID value.

9. The method of claim 1, further comprising decoding an indicator value from the first set of syntax elements, the indicator value indicating whether the functionality information may be applied to the segment without the first packet being referenced by the second packet.

10. The method of claim 1, wherein the functionality information comprises film grain parameters, luma mapping with chroma scaling (LMCS) parameters, mastering display color volume parameters, content light level parameters, ambient viewing environment parameters, content color volume parameters, sphere rotation parameters, region-wise packing parameters, omni-directional viewport parameters, sample aspect ratio parameters, annotated regions parameters, scalability dimension parameters, multiview acquisition parameters, depth representation parameters, a filter model type, a filter strength, and/or a model description.

11. A method for encoding a segment to a bitstream, the method comprising:
determining an identifier value for a first packet of a first packet type, the identifier value representing an identifier of the first packet and the first packet comprising a first set of syntax elements in the bitstream;
encoding the identifier value to one or more syntax elements in the first set of syntax elements;
determining a functionality to be applied to a segment, the functionality being specified by a functionality information;
encoding the functionality information to one or more syntax elements of a set of syntax elements in the bitstream;
encoding a reference identifier (ID) value corresponding to the identifier value to one or more syntax elements in a second set of syntax elements, wherein a second packet of a second packet type comprises the second set of syntax elements in the bitstream; and
encoding the segment to one or more syntax elements in a third set of syntax elements, wherein a third packet of a third packet type comprises the third set of syntax elements in the bitstream, wherein the segment is associated with the second packet.

12. The method of claim 11, wherein encoding the functionality information to one or more syntax elements of a set of syntax elements in the bitstream comprises encoding the functionality information to the first set of syntax elements in the first packet.

13. The method of claim 11, wherein the segment comprises a picture, a subpicture, a slice, a tile, and/or a coding tree unit (CTU).

14. The method of claim 11, wherein:
(i) the segment is in the same Access Unit, AU, or Picture Unit, PU, as the second packet;
(ii) the third packet comprising the segment directly follows the second packet in the bitstream;
(iii) the second packet is the closest preceding packet of the second packet type, wherein the closest preceding packet of the second packet type is the packet having a second packet type that precedes the third packet comprising the segment in decoding order and there is no other packet having the second packet type that follows the closest preceding packet and precedes the third packet comprising the segment in decoding order;
(iv) the second packet comprises a persistence flag specifying that the second packet is associated to the segment or to the third packet comprising the segment; and/or
(v) encoding a segment identifier value into the bitstream and encoding a reference segment ID value into the second packet, wherein the segment identifier value corresponds to the reference segment ID value.

15. The method of claim 11, wherein the functionality information comprises information specifying a film grain model, and the method further comprises encoding a seed value to one or more syntax elements in the second set of syntax elements.

16. A non-transitory computer readable storage medium storing a computer program comprising instructions which when executed by processing circuitry of a node, causes the node to perform the method of claim 1.

17. A decoder for decoding a segment from a bitstream, the decoder comprising:
memory; and
processing circuitry, wherein the decoder is configured to:
receive a first packet of a first packet type in the bitstream, the first packet comprising a first set of syntax elements;
decode an identifier value from one or more syntax elements in the first set of syntax elements of the first packet, the identifier value representing an identifier of the first packet;
decode a functionality information from a set of syntax elements in the bitstream, wherein the functionality information specifies a functionality;
receive a second packet of a second packet type in the bitstream, the second packet comprising a second set of syntax elements;
decode a reference identifier (ID) value from one or more syntax elements in the second set of syntax elements of the second packet;
receive a third packet of a third packet type in the bitstream, the third packet comprising a third set of syntax elements, wherein the third set of syntax elements encodes the segment;
determine that the segment is associated with the second packet;
determine that the reference ID value corresponds to the identifier value;

in response to determining that the reference ID value corresponds to the identifier value, select the functionality information from the first set of syntax elements;
decode the segment from the third set of syntax elements; and
apply the functionality to the segment based on the selected functionality information.

18. An encoder for encoding a segment to a bitstream, the encoder comprising:
memory; and
processing circuitry, wherein the encoder is configured to:
determine an identifier value for a first packet of a first packet type, the identifier value representing an identifier of the first packet and the first packet comprising a first set of syntax elements in the bitstream;
encode the identifier value to one or more syntax elements in the first set of syntax elements;
determine a functionality to be applied to a segment, the functionality being specified by a functionality information;
encode the functionality information to one or more syntax elements of a set of syntax elements in the bitstream;
encode a reference identifier (ID) value corresponding to the identifier value to one or more syntax elements in a second set of syntax elements, wherein a second packet of a second packet type comprises the second set of syntax elements in the bitstream; and
encode the segment to one or more syntax elements in a third set of syntax elements, wherein a third packet of a third packet type comprises the third set of syntax elements in the bitstream, wherein the segment is associated with the second packet.

19. A non-transitory computer readable storage medium storing a computer program comprising instructions which when executed by processing circuitry of a node, causes the node to perform the method of claim 11.

* * * * *